US012631741B2

(12) United States Patent
Liu et al.

(10) Patent No.: US 12,631,741 B2
(45) Date of Patent: May 19, 2026

(54) SENSING MEASUREMENT INFORMATION EXCHANGE APPARATUS

(71) Applicant: HUAWEI TECHNOLOGIES CO., LTD., Shenzhen (CN)

(72) Inventors: Chenchen Liu, Shenzhen (CN); Yunbo Li, Shenzhen (CN); Rui Du, Shenzhen (CN); Meihong Zhang, Shenzhen (CN); Xiao Han, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 564 days.

(21) Appl. No.: 18/147,035

(22) Filed: Dec. 28, 2022

(65) Prior Publication Data

US 2023/0132850 A1 May 4, 2023

Related U.S. Application Data

(63) Continuation of application No. PCT/CN2021/101148, filed on Jun. 21, 2021.

(30) Foreign Application Priority Data

Jul. 1, 2020 (CN) .......................... 202010625247.8

(51) Int. Cl.
  *G01S 13/58* (2006.01)
  *G01S 7/00* (2006.01)
      (Continued)
(52) U.S. Cl.
  CPC ............ *G01S 13/582* (2013.01); *G01S 7/006* (2013.01); *G01S 13/003* (2013.01); *H04W 24/10* (2013.01); *H04W 64/00* (2013.01)
(58) Field of Classification Search
  CPC ...... G01S 13/582; G01S 7/006; G01S 13/003; H04W 24/10; H04W 64/00
  See application file for complete search history.

(56) References Cited

U.S. PATENT DOCUMENTS

2018/0365975 A1* 12/2018 Xu ........................ G08B 29/185
2019/0317203 A1* 10/2019 Rosson ................... G01S 13/46
          (Continued)

FOREIGN PATENT DOCUMENTS

CN        105487072 A      4/2016
CN        108023631 A      5/2018
          (Continued)

OTHER PUBLICATIONS

Deepak Vasisht,Swarun Kumar,and Dina Katabi.2016.Decimeter-level localization with a single WiFi access point.In Proceedings of the 13th Usenix Conference on Networked Systems Design and Implementation (NSDI"16).USENIX Association, Berkeley, CA,USA,165-178.total 15 pages.
          (Continued)

*Primary Examiner* — William Kelleher
*Assistant Examiner* — Hailey R Le
(74) *Attorney, Agent, or Firm* — HAUPTMAN HAM, LLP

(57) ABSTRACT
This application provides a sensing measurement information exchange apparatus, applied to a first station. The apparatus includes: a transceiver unit, configured to receive sensing measurement report information sent by a second station, where the sensing measurement report information includes N groups of first measurement results, where the N groups of first measurement results are in a one-to-one correspondence with N first transmission paths between the first station and the second station, and each group of first measurement results includes an angle of arrival, relative time of flight, and a Doppler frequency shift of a corresponding first transmission path; and a processing unit, configured to obtain angles of arrival, relative time of flight, and Doppler frequency shifts of the N first transmission paths based on the sensing measurement report information. This application implements measurement of locations and instantaneous speeds of a plurality of passive targets.

18 Claims, 12 Drawing Sheets

(51) Int. Cl.
| | |
|---|---|
| *G01S 13/00* | (2006.01) |
| *H04W 24/10* | (2009.01) |
| *H04W 64/00* | (2009.01) |

(56) References Cited

U.S. PATENT DOCUMENTS

| | | | | |
|---|---|---|---|---|
| 2020/0191943 A1* | 6/2020 | Wu | | G01S 13/726 |
| 2021/0321221 A1* | 10/2021 | Yerramalli | | G01S 11/02 |
| 2022/0066018 A1* | 3/2022 | Han | | G01S 13/878 |
| 2023/0236303 A1* | 7/2023 | Trainin | | G01S 7/006 |
| | | | | 342/146 |

FOREIGN PATENT DOCUMENTS

| | | | |
|---|---|---|---|
| EP | 3986018 A1 | 4/2022 | |
| WO | 2019043446 A1 | 3/2019 | |
| WO | 2021004378 A1 | 1/2021 | |

OTHER PUBLICATIONS

International Search Report issued in corresponding International Application No. PCT/CN2021/101148, dated Sep. 18, 2021, pp. 1-9.
Extended European Search Report issued in corresponding European Application No. 21831550.5, dated Oct. 26, 2023, pp. 1-14.

* cited by examiner

| Frame control Frame Control | Duration Duration | Receiver address RA | Transmitter address TA | Sounding dialog token Sounding Dialog Token | Station information 1 STA Info 1 | ... | Station information n STA Info n | Station information Security authentication code STA Info SAC | Frame check sequence FCS |
|---|---|---|---|---|---|---|---|---|---|
| 2 | 2 | 6 | 6 | 1 | 4 | | 4 | 4 | 4 |

Quantity of bytes

FIG. 3a

| Ranging Ranging | HE/VHT | Sounding dialog token Sounding Dialog Token Number |
|---|---|---|

| Quantity of bits | 1 | 1 | 6 |

FIG. 3b

| Association identifier AID 11/ RID 11 | Offset Offset | Responder-to-initiator space-time stream quantity R2I N_STS | Responder-to-initiator repetition count R2I_Rep | Initiator-to-responder space-time stream quantity I2R N_STS | First reserved Reserved | Disambiguation Disambiguation | Initiator-to-responder repetition count I2R Rep | Second reserved Reserved |
|---|---|---|---|---|---|---|---|---|

| Quantity of bits | 11 | 6 | 3 | 3 | 3 | 1 | 1 | 3 | 1 |

FIG. 3c

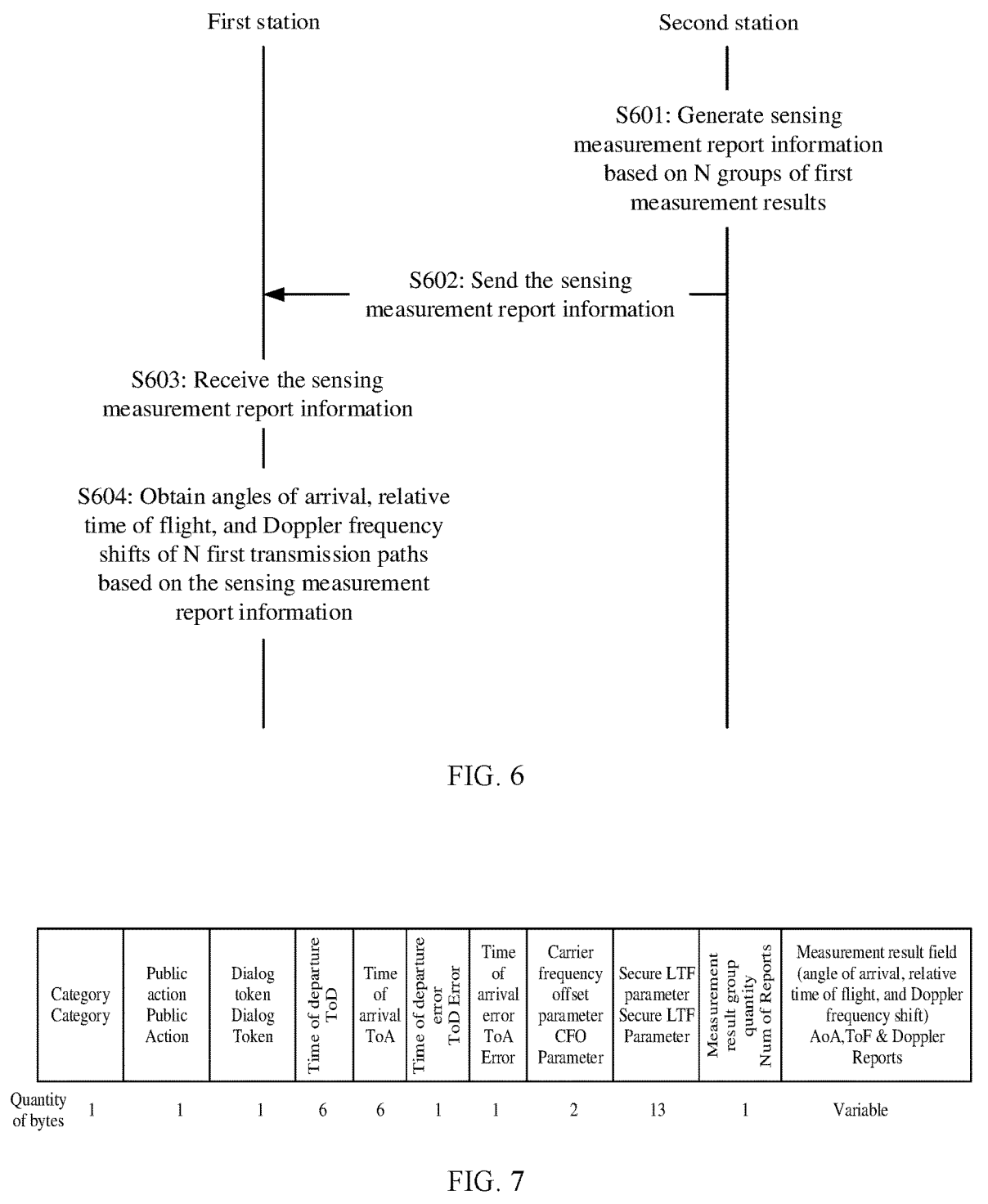

First station                                    Second station

S601: Generate sensing
measurement report information
based on N groups of first
measurement results S602: Send the sensing
measurement report information S603: Receive the sensing
measurement report information S604: Obtain angles of arrival, relative
time of flight, and Doppler frequency
shifts of N first transmission paths
based on the sensing measurement
report information

FIG. 6

| Category Category | Public action Public Action | Dialog token Dialog Token | Time of departure ToD | Time of arrival ToA | Time of departure error ToD Error | Time of arrival error ToA Error | Carrier frequency offset parameter CFO Parameter | Secure LTF parameter Secure LTF Parameter | Measurement result group quantity Num of Reports | Measurement result field (angle of arrival, relative time of flight, and Doppler frequency shift) AoA,ToF & Doppler Reports |
|---|---|---|---|---|---|---|---|---|---|---|
| Quantity of bytes 1 | 1 | 1 | 6 | 6 | 1 | 1 | 2 | 13 | 1 | Variable |

FIG. 7

| Category<br>Category | Public action<br>Public<br>Action | Dialog token<br>Dialog<br>Token | Carrier<br>frequency offset<br>parameter<br>CFO Parameter | Measurement<br>result group<br>quantity<br>Num of<br>Reports | Measurement result field (angle of<br>arrival, relative time of flight, and<br>Doppler frequency shift)<br>AoA, ToF & Doppler Reports |
|---|---|---|---|---|---|
| 1 | 1 | 1 | 2 | 1 | Variable |

Quantity
of bytes

FIG. 8

| Element identifier Element Id | Element length Element Length | Element ID extension Element ID Extension | Dialog token Dialog Token | Carrier frequency offset parameter CFO | Measurement result group quantity Num of Reports | Measurement result field (angle of arrival, relative time of flight, and Doppler frequency shift) AoA, ToF & Doppler Reports |
|---|---|---|---|---|---|---|
| 1 | 1 | 1 | 1 | 2 | 1 | Variable |

Quantity of bytes

FIG. 9

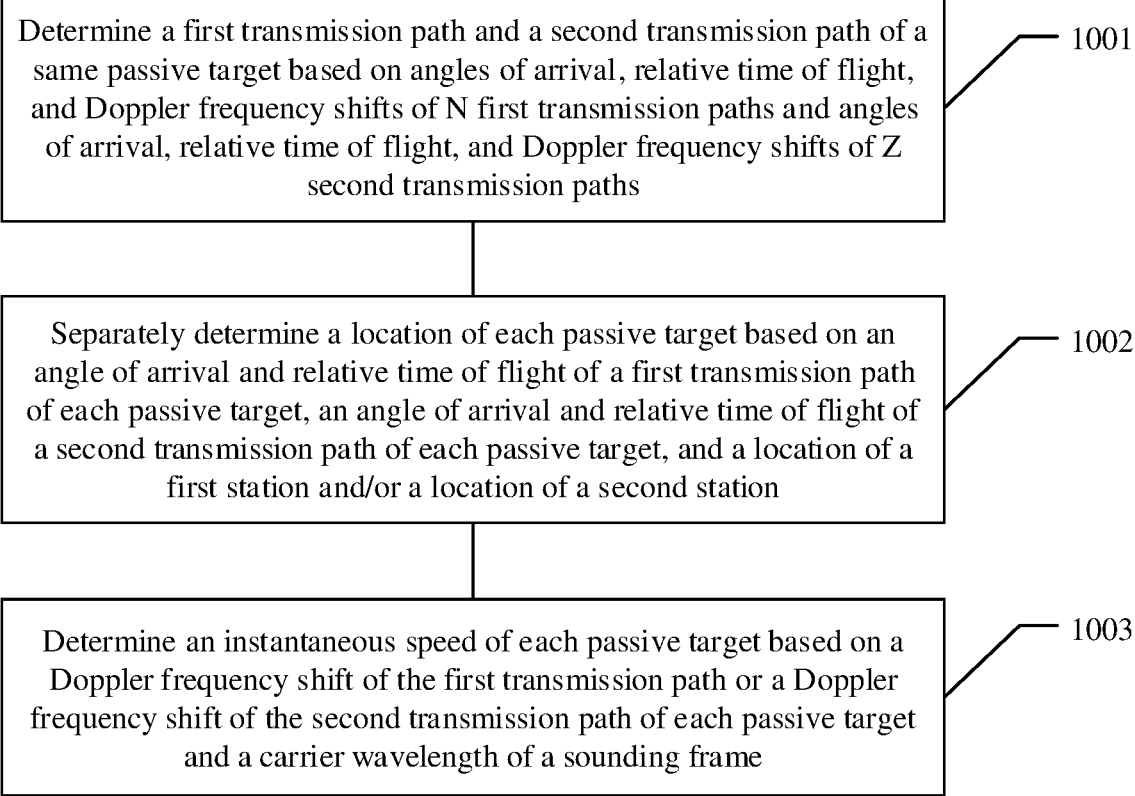

Determine a first transmission path and a second transmission path of a same passive target based on angles of arrival, relative time of flight, and Doppler frequency shifts of N first transmission paths and angles of arrival, relative time of flight, and Doppler frequency shifts of Z second transmission paths          1001

Separately determine a location of each passive target based on an angle of arrival and relative time of flight of a first transmission path of each passive target, an angle of arrival and relative time of flight of a second transmission path of each passive target, and a location of a first station and/or a location of a second station          1002

Determine an instantaneous speed of each passive target based on a Doppler frequency shift of the first transmission path or a Doppler frequency shift of the second transmission path of each passive target and a carrier wavelength of a sounding frame          1003

FIG. 10

SENSING MEASUREMENT INFORMATION EXCHANGE APPARATUS

CROSS-REFERENCE TO RELATED APPLICATIONS

This application is a continuation of International Application No. PCT/CN2021/101148, filed on Jun. 21, 2021, which claims priority to Chinese Patent Application No. 202010625247.8, filed on Jul. 1, 2020, the disclosures of the aforementioned applications are hereby incorporated by reference in their entireties.

TECHNICAL FIELD

This application relates to the field of communication technologies, and in particular, to a sensing measurement information exchange apparatus.

BACKGROUND

Radar has been widely used in the field of target detection technologies. A principle of radar detection is as follows: A radar transmitting system transmits a specific electromagnetic wave signal. The electromagnetic wave signal is reflected by a target during propagation. A radar receiving system receives the reflected signal, compares the reflected signal with the transmitted signal, and calculates information such as a distance, a moving speed, and an orientation of the target.

With development of science and technology, Wi-Fi devices have been widely used. Because a main structure of the Wi-Fi device is similar to a basic structure of a radar device, radar technologies may be introduced into the Wi-Fi device, so that the Wi-Fi device has a detection capability while completing a communication function.

Currently, in some approaches of detecting the target by using the Wi-Fi device, a location of a passive target can be located, and an instantaneous speed of the passive target cannot be determined.

SUMMARY

One or more embodiments of the present application disclose a sensing measurement information exchange method and an apparatus thereof, that is useable to determine a location and an instantaneous speed of a passive target.

According to a first aspect, a sensing measurement information exchange method is provided. The method includes: A first station receives sensing measurement report information sent by a second station, where the sensing measurement report information includes N groups of first measurement results, the N groups of first measurement results are in a one-to-one correspondence with N first transmission paths between the first station and the second station, and each group of first measurement results includes an angle of arrival, relative time of flight, and a Doppler frequency shift of a corresponding first transmission path; and the first station obtains angles of arrival, relative time of flight, and Doppler frequency shifts of the N first transmission paths based on the sensing measurement report information.

Because the sensing measurement report information includes the N groups of first measurement results, and one measurement result includes an angle of arrival, relative time of flight, and a Doppler frequency shift of a corresponding first transmission path, the first station can determine, based on an angle of arrival, relative time of flight, and a Doppler frequency shift of each of the N first transmission paths in the N groups of first measurement results, locations and instantaneous speeds of passive targets corresponding to the N first transmission paths. This can implement measurement of locations and instantaneous speeds of a plurality of passive targets.

According to a second aspect, a sensing measurement information exchange method is provided. The method includes: A second station generates sensing measurement report information based on N groups of first measurement results, where the N groups of first measurement results are in a one-to-one correspondence with N first transmission paths between a first station and the second station, and each group of first measurement results includes an angle of arrival, relative time of flight, and a Doppler frequency shift of a corresponding first transmission path; and the second station sends the sensing measurement report information to the first station.

According to a third aspect, a sensing measurement information exchange apparatus is provided, applied to a first station. The apparatus includes: a transceiver unit, configured to receive sensing measurement report information sent by a second station, where the sensing measurement report information includes N groups of first measurement results, where the N groups of first measurement results are in a one-to-one correspondence with N first transmission paths between the first station and the second station, and each group of first measurement results includes an angle of arrival, relative time of flight, and a Doppler frequency shift of a corresponding first transmission path; and a processing unit, configured to obtain angles of arrival, relative time of flight, and Doppler frequency shifts of the N first transmission paths based on the sensing measurement report information.

According to a fourth aspect, a sensing measurement information exchange apparatus is provided, applied to a second station. The apparatus includes: a processing unit, configured to generate sensing measurement report information based on N groups of first measurement results, where the N groups of first measurement results are in a one-to-one correspondence with N first transmission paths between a first station and the second station, and each group of first measurement results includes an angle of arrival, relative time of flight, and a Doppler frequency shift of a corresponding first transmission path; and a transceiver unit, configured to send the sensing measurement report information to the first station.

According to a fifth aspect, a sensing measurement information exchange apparatus is provided, including a processor and a memory. The memory stores instructions, and when the instructions are run by the processor, the sensing measurement information exchange apparatus is enabled to perform the following operations: receiving sensing measurement report information sent by a second station, where the sensing measurement report information includes N groups of first measurement results, the N groups of first measurement results are in a one-to-one correspondence with N first transmission paths between the first station and the second station, and each group of first measurement results includes an angle of arrival, relative time of flight, and a Doppler frequency shift of a corresponding first transmission path; and obtaining angles of arrival, relative time of flight, and Doppler frequency shifts of the N first transmission paths based on the sensing measurement report information.

According to a sixth aspect, a sensing measurement information exchange apparatus is provided, including a processor and a memory. The memory stores instructions, and when the instructions are run by the processor, the sensing measurement information exchange apparatus is enabled to perform the following operations: generating sensing measurement report information based on N groups of first measurement results, where the N groups of first measurement results are in a one-to-one correspondence with N first transmission paths between a first station and the second station, and each group of first measurement results includes an angle of arrival, relative time of flight, and a Doppler frequency shift of a corresponding first transmission path; and sending the sensing measurement report information to the first station.

In an implementation of the method or the apparatus in any one of the foregoing aspects, the sensing measurement report information further includes measurement result group quantity information. The measurement result group quantity information indicates a group quantity N of the first measurement results.

In an implementation of the method or the apparatus in any one of the foregoing aspects, the sensing measurement report information further includes report type information. The report type information indicates a type of the sensing measurement report information.

In an implementation of the method or the apparatus in any one of the foregoing aspects, the sensing measurement report information further includes carrier frequency offset parameter information. The carrier frequency offset parameter information indicates a carrier frequency offset.

In an implementation of the method or the apparatus in any one of the foregoing aspects, the sensing measurement report information is carried in a location measurement report frame, where a measurement result field and a measurement result group quantity field are added to the location measurement report frame, where a value of the measurement result field is the N groups of first measurement results, a value of the measurement result group quantity field is the group quantity N of the first measurement results, a value of a type field in the location measurement report frame is a first value, indicating that a type of the location measurement report frame is a sensing measurement report frame, and a value of a carrier frequency offset parameter field in the location measurement report frame is the offset. Alternatively, the sensing measurement report information is carried in a predefined frame, where the predefined frame includes a type field, a measurement result field, a measurement result group quantity field, and a carrier frequency offset parameter field, where a value of the type field is a second value, indicating that a type of the predefined frame is a sensing measurement report frame, a value of the measurement result field is the N groups of first measurement results, a value of the measurement result group quantity field is the group quantity N of the first measurement results, and a value of the carrier frequency offset parameter field is the carrier frequency offset. Alternatively, the sensing measurement report information is carried in a predefined element, where the predefined element includes an element identifier field, a measurement result field, a measurement result group quantity field, and a carrier frequency offset parameter field, where a value of the element identifier field is a third value, indicating that a type of the predefined element is a sensing measurement report element, a value of the measurement result field is the N groups of first measurement results, a value of the measurement result group quantity field is the group quantity N of the first measurement results, and a value of the carrier frequency offset parameter field is the carrier frequency offset.

In an implementation of the method or the apparatus in the first aspect, the third aspect, or the fifth aspect, before the sensing measurement report information sent by the second station is received, the M sensing measurements are performed with the second station. Each sensing measurement includes: sending a first sounding frame to the second station; and receiving a second sounding frame sent by the second station.

In an implementation of the method or the apparatus in the first aspect, the third aspect, or the fifth aspect, before the M sensing measurements are performed with the second station, sensing measurement announcement information is sent to the second station. The sensing measurement announcement information indicates the second station to perform sensing measurement.

In an implementation of the method or the apparatus in the first aspect, the third aspect, or the fifth aspect, before the M sensing measurements are performed with the second station, the sensing measurement announcement information is sent to the second station at a first moment. The first moment is one moment in a first time period. The first time period is an overlap between a time period in which the first station can perform sensing measurement and a time period in which the second station can perform sensing measurement.

In an implementation of the method or the apparatus in the first aspect, the third aspect, or the fifth aspect, before the sensing measurement announcement information is sent to the second station, a sensing measurement request is sent to the second station. The sensing measurement request carries a time period in which the first station can perform sensing measurement, channel information, and a maximum quantity of times of sensing measurement that can be performed between the first station and the second station. The maximum quantity of times of sensing measurement is greater than or equal to M. Response information sent by the second station is received based on the sensing measurement request. The response information carries the first time period. The first time period is the overlap between the time period in which the first station can perform sensing measurement and the time period in which the second station can perform sensing measurement.

In an implementation of the method or the apparatus in the first aspect, the third aspect, or the fifth aspect, the following is further included: Z groups of second measurement results are determined based on M second sounding frames received in the M sensing measurements. The Z groups of second measurement results are in a one-to-one correspondence with Z second transmission paths between the first station and the second station. Each group of second measurement results includes an angle of arrival, relative time of flight, and a Doppler frequency shift of a corresponding second transmission path. A location and an instantaneous speed of each passive target are determined based on the angles of arrival, the relative time of flight, and the Doppler frequency shifts of the N first transmission paths, and angles of arrival, relative time of flight, and Doppler frequency shifts of the Z second transmission paths. The passive target is located on the transmission path.

In an implementation of the method or the apparatus in the first aspect, the third aspect, or the fifth aspect, determining the location and the instantaneous speed of the passive target includes: determining a first transmission path and a second transmission path of a same passive target based on the angles of arrival, the relative time of flight, and the Doppler frequency shifts of the N first transmission paths, and the angles of arrival, the relative time of flight, and the Doppler frequency shifts of the Z second transmission paths, to obtain a first transmission path and a second transmission path of each passive target; separately determining a location of each passive target based on an angle of arrival and relative time of flight of the first transmission path of each passive target, an angle of arrival and relative time of flight of the second transmission path of each passive target, and a location of the first station and/or a location of the second station; and determining the instantaneous speed of each passive target based on a Doppler frequency shift of the first transmission path or a Doppler frequency shift of the second transmission path of each passive target and a carrier wavelength of the sounding frame.

A first transmission path and a second transmission path of a same passive target are determined based on the angles of arrival, the relative time of flight, and the Doppler frequency shifts of the N first transmission paths and the Doppler frequency shifts of the N first transmission paths, and the angles of arrival, the relative time of flight, and the Doppler frequency shifts of the Z second transmission paths. Further, the location of each passive target is separately determined based on an angle of arrival and relative time of flight of the first transmission path of each passive target, an angle of arrival and relative time of flight of the second transmission path of each passive target, and a location of the first station and/or a location of the second station. Location determining steps are simple and easy to perform. The instantaneous speed of the passive target may be calculated through the Doppler frequency shift of the first transmission path or the second transmission path of the passive target. The step is simple and easy to perform. Because there are a plurality of first transmission paths and a plurality of second transmission paths, a plurality of transmission paths overlap in the plurality of first transmission paths and the plurality of second transmission paths. In addition, the passive target is on the transmission path. Therefore, locations and instantaneous speeds of a plurality of passive targets may be determined based on the plurality of first transmission paths and the plurality of second transmission paths. In addition, compared with a manner of determining a location of a target based on transmission time in some approaches, in this application, the location of the passive target is determined based on the relative time of flight and the angle of arrival of transmission on the first transmission path and the relative time of flight and the angle of arrival of transmission on the second transmission path. This can improve accuracy of a location measurement result of the passive target and robustness of a system.

In an implementation of the method or the apparatus in the second aspect, the fourth aspect, or the sixth aspect, before the sensing measurement report information is generated based on N groups of first measurement results, M sensing measurements are performed with the first station. Each sensing measurement includes: receiving a first sounding frame sent by the first station; and sending a second sounding frame to the first station.

In an implementation of the method or the apparatus in the second aspect, the fourth aspect, or the sixth aspect, before the M sensing measurements are performed with the first station, sensing measurement announcement information sent by the first station is received. The sensing measurement announcement information indicates the second station to perform sensing measurement.

In an implementation of the method or the apparatus in the second aspect, the fourth aspect, or the sixth aspect, before the M sensing measurements are performed with the first station, the sensing measurement announcement information sent by the first station is received at a first moment. The first moment is one moment in a first time period. The first time period is an overlap between a time period in which the first station can perform sensing measurement and a time period in which the second station can perform sensing measurement.

In an implementation of the method or the apparatus in the second aspect, the fourth aspect, or the sixth aspect, before the sensing measurement announcement information sent by the first station is received, a sensing measurement request sent by the first station is received. The sensing measurement request carries a time period in which the first station can perform sensing measurement, channel information, and a maximum quantity of times of sensing measurement that can be performed between the first station and the second station. The maximum quantity of times of sensing measurement is greater than or equal to M. Response information is sent to the first station in response to the sensing measurement request. The response information carries the first time period. The first time period is the overlap between the time period in which the first station can perform sensing measurement and the time period in which the second station can perform sensing measurement.

In an implementation of the method or the apparatus in the second aspect, the fourth aspect, or the sixth aspect, the following is further included: The N groups of first measurement results are determined based on M first sounding frames received in the M sensing measurements.

In an implementation of the method or the apparatus in any one of the foregoing aspects, the sensing measurement announcement information further carries a quantity M of times of sensing measurement and/or sensing measurement termination information.

In an implementation of the method or the apparatus in any one of the foregoing aspects, the sensing measurement announcement information is carried in a null data packet announcement frame. A value of a frame type subfield in a frame control field in the null data packet announcement frame is a fourth value, indicating the second station to perform sensing measurement, and a value of any subfield in a station information field in the null data packet announcement frame is the quantity M of times of the sensing measurement or the sensing measurement termination information. Alternatively, a value of a reserved bit in a sounding dialog token field in the null data packet announcement frame is a fifth value, indicating the second station to perform sensing measurement, and a value of any subfield in a station information field in the null data packet announcement frame is the quantity M of times of the sensing measurement or the sensing measurement termination information. Alternatively, a value of some reserved bits in a station information field in the null data packet announcement frame is a sixth value, indicating the second station to perform sensing measurement, and a value of some reserved bits is the sensing measurement termination information. Alternatively, a value of a reserved bit in one station information field in the null data packet announcement frame is a seventh value, indicating the second station to perform sensing measurement, and a value of a reserved bit in another station information field in the null data packet announcement frame is the quantity M of times of the sensing measurement or the sensing measurement termination information. Alternatively, a value of an association identifier subfield in a station information field in the null data packet announcement frame is any integer ranging from 2008 to 2047, indicating the second station to perform sensing measurement, and a value of a remaining field in the station information field is the quantity M of times of the sensing measurement or the sensing measurement termination information.

The sensing measurement information exchange apparatus in the third aspect, the fourth aspect, the fifth aspect, and the sixth aspect may be a chip. The processing unit may be a processing circuit of the chip. The transceiver unit may be an input/output interface circuit. The processing circuit may be configured to process signaling or data information provided by the input/output interface circuit. The input/output interface circuit may be configured to input/output the data or signaling information for the chip.

According to a seventh aspect of embodiments of this application, a computer-readable storage medium is provided. The computer-readable storage medium stores computer program code. When the computer program runs on a processor, the processor is enabled to perform the method in any one of the first aspect and the second aspect and the corresponding possible implementations.

According to an eighth aspect of embodiments of this application, a computer program product is provided. The program product stores a computer program (instructions) executed by the foregoing processor. When the computer program runs on the processor, the processor is enabled to perform the method in any one of the first aspect and the second aspect and the corresponding possible implementations.

According to a ninth aspect of embodiments of this application, a sensing measurement information exchange apparatus is provided. The apparatus includes a processor, and may further include a transceiver and a memory. The transceiver is configured to receive and send information, or is configured to communicate with another network element. The memory is configured to store a computer program (instructions). The processor is configured to execute the computer program, to support the sensing measurement information exchange apparatus to implement the method in any one of the first aspect and the second aspect and the corresponding possible implementations.

According to a tenth aspect of embodiments of this application, a sensing measurement information exchange apparatus is provided. The apparatus may exist in a product form of a chip. A structure of the apparatus includes a processor, and may further include a memory. The memory is configured to couple to the processor and store a program (instructions) and data that are necessary for the apparatus. The processor is configured to execute the computer program stored in the memory, to support the communication apparatus to perform the method in any one of the first aspect and the second aspect and the corresponding possible implementations. In some embodiments, the memory may be located in the processor, and is an internal storage. Alternatively, the processor may be located outside the processor, is coupled to the processor, and is an external storage.

BRIEF DESCRIPTION OF DRAWINGS

FIG. 3a is a schematic diagram of a format of a null data packet announcement frame that does not carry sensing measurement announcement information according to at least one embodiment of this application;

FIG. 3b is a schematic diagram of a format of a sounding dialog token field according to at least one embodiment of this application;

FIG. 3c is a schematic diagram of a format of a station information field according to at least one embodiment of this application;

FIG. 6 is a schematic flowchart of a sensing measurement report exchange method according to at least one embodiment of this application;

FIG. 7 is a schematic diagram of a structure of an LMR frame according to at least one embodiment of this application;

FIG. 8 is a schematic diagram of a structure of a predefined frame according to at least one embodiment of this application;

FIG. 9 is a schematic diagram of a structure of a predefined element according to at least one embodiment of this application;

FIG. 10 is a schematic flowchart of determining a location and an instantaneous speed of a passive target according to at least one embodiment of this application;

DESCRIPTION OF EMBODIMENTS

Figure 1:
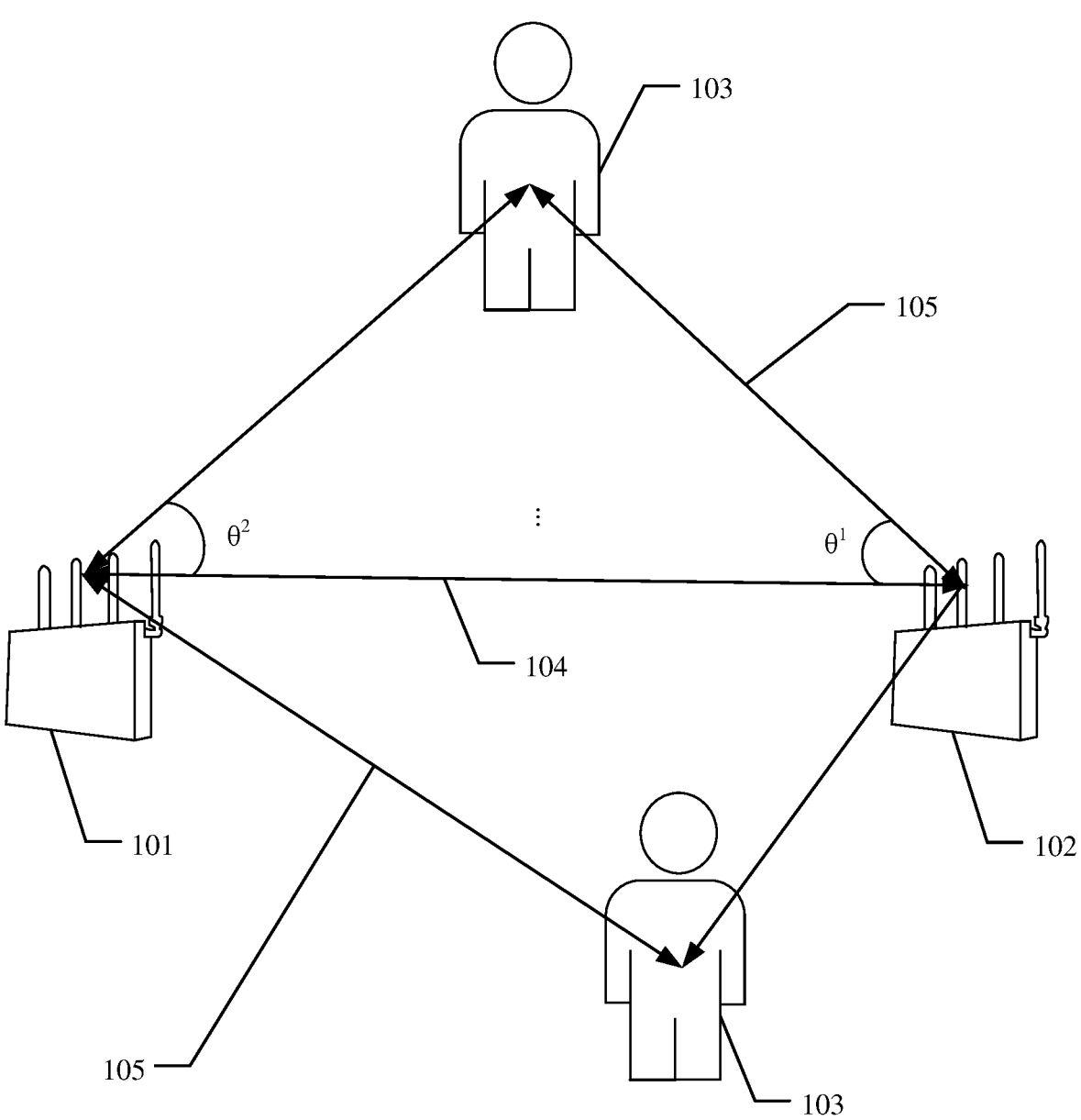
FIG. 1 is a first schematic diagram of an application scenario of sensing measurement according to at least one embodiment of this application.

The following describes technical solutions of this application with reference to accompanying drawings.

To make the objectives, technical solutions, and advantages of this application clearer, the following clearly describes the technical solutions in this application with reference to the accompanying drawings in this application. It is clear that the described embodiments are a part rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, terms "first", "second", and the like are only intended for distinguishing and description, and shall not be understood as an indication or implication of relative importance or an indication or implication of an order. In addition, the terms "include", "comprise", or any other variant thereof are intended to cover a non-exclusive inclusion, for example, a series of steps or units. Methods, systems, products, or devices are not necessarily limited to those steps or units that are literally enumerated, but may include other steps or units that are not literally enumerated or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

First, a manner of detecting a target by using a Wi-Fi device in some approaches is described. Details are as follows.

In some approaches, the target is detected through fine time measurement (FTM, fine time measurement). A specific process is as follows: A transmit station interacts with a receive station for a plurality of times. Round-trip time of sounding signal transmission between the two stations is calculated. Then, a propagation distance of the sounding signal between the transmit station and the receive station is calculated based on a transmission speed of an electromagnetic wave and the round-trip time. When there is a line of sight between the transmit station and the receive station, the propagation distance of the sounding signal between the transmit station and the receive station is a distance between the transmit station and the receive station. When there is no line of sight between the transmit station and the receive station, a distance between the transmit station and the receive station cannot be measured by using this method.

In some approaches, when there is no line of sight between the transmit station and the receive station, the distance between the transmit station and the receive station cannot be determined. In addition, the distance between the transmit station and the receive station is determined through exchange between the transmit station and the receive station, and both the transmit station and the receive station are active devices, to be specific, only a distance between the active devices can be measured, and a distance between the passive devices cannot be measured. In other words, the technology cannot be applied to locating a passive target, and an instantaneous speed of the passive target cannot be determined. In addition, a distance is measured based on transmission time of the sounding signal. Time measurement has limited precision due to limitations of a bandwidth and an indoor multipath signal, and a small time error causes a large distance error. Therefore, ranging has low precision.

In some approaches, a transmit station transmits a sounding signal in a specific direction toward a passive target, and the sounding signal is received by a receive station after being reflected by the passive target. The receive station calculates an angle of arrival of the sounding signal, and feeds back the angle of arrival of the sounding signal to the transmit station. The transmit station determines a location of the passive target based on the angle of arrival and an angle of departure of the sounding signal and locations of the transmit station and the receive station.

Obviously, in some approaches, although the location of the passive target can be determined, because an orientation of the passive target is unknown, repeated scanning in a plurality of different directions is required to complete sounding of the passive target. In addition, due to limitations such as quantities of antennas, antenna apertures, and frequency bands of the transmit station and the receive station, the sounding signal has poor directivity. In this case, the angle of departure of the sounding signal has low precision, and therefore the passive target has low locating precision. In addition, only a single passive target can be measured at most in each sounding, and a plurality of passive targets cannot be simultaneously measured. An instantaneous speed of the passive target cannot be measured.

In some approaches, a transmit station omnidirectionally sends a sounding signal, and a receive station receives a superimposed signal formed by a line-of-sight signal and a reflected signal reflected by a passive target. The receive station measures an angle of arrival of the reflected signal, and a time difference between the line-of-sight signal and the reflected signal arriving at the receive station, and determines a sum of distances from the passive target to both the transmit station and the receive station based on locations of the transmit station and the receive station. Then, the passive target is determined on an ellipse whose focuses are the transmit station and the receive station, and an intersection point of the ellipse and a ray that is opposite to a direction of the angle of arrival is determined as a location of the passive target based on the angle of arrival of the reflected signal.

In some approaches, time measurement has limited precision due to limitations of a bandwidth and an indoor multipath environment, resulting in a large error in a ranging result and low locating precision. In addition, in this method, a line of sight is required between the transmit station and the receive station. In addition, an instantaneous speed of the passive target cannot be measured.

In conclusion, in some approaches, the distance between the active devices can be measured only when there is the line of sight between the transmit station and the receive station. Ranging has low precision, and the technology cannot be directly used to locate the passive target. In some approaches, repeated scanning in the plurality of different directions is required to complete sounding of the passive target. Only one passive target can be measured in each sounding. The passive target has low locating precision. In some approaches, the passive target can be located only when there is the line of sight between the transmit station and the receive station, and the locating precision is not high. In addition, the instantaneous speed of the passive target cannot be measured in the foregoing manners.

To resolve the foregoing problem, this application provides a sensing measurement method. The method performs bidirectional sensing measurement for a plurality of times between two stations, to determine locations and instantaneous speeds of the plurality of passive targets based on channel reciprocity. The following describes in detail an implementation principle of the sensing measurement method.

First, an application scenario of the sensing measurement method is described.

FIG. 1 is a first schematic diagram of the application scenario of the sensing measurement method according to an embodiment of this application. As shown in FIG. 1, the application scenario includes a first station 101, a second station 102, and at least one passive target 103.

Both the first station 101 and the second station 102 are devices that include a plurality of antennas and that can measure an angle of arrival of a received signal, for example, a Wi-Fi device, a notebook computer, or a mobile phone. This is not specially limited in this application.

The passive target 103 may be, for example, a person, an animal, or an automobile. This is not specially limited in this application.

In the foregoing application scenario, a plurality of times of sensing measurement may be performed between the first station 101 and the second station 102, and a location and an instantaneous speed of each passive target 103 of the at least one passive target 103 are determined based on results of the plurality of times of sensing measurement. Because a principle of sensing measurement is described below, details are not described herein again.

It should be noted that the foregoing application scenario is only an example, and is not intended to limit this application. For example, in another application scenario, a first station and a plurality of second stations are included. The first station simultaneously performs sensing measurement with each second station for a plurality of times, and separately determines, based on results of the plurality of times of sensing measurement between the first station and each second station, a location and an instantaneous speed of at least one passive target corresponding to the first station and each second station.

The following describes a specific implementation process of the sensing measurement method based on the application scenario shown in FIG. 1.

The sensing measurement method mainly includes three processes: a negotiation process, a sensing measurement process, and a result exchange process.

In the negotiation process, when the first station 101 needs to sense the location and the instantaneous speed of the passive target 103, the first station 101 sends a sensing measurement request to the second station 102, to negotiate related information in the sensing measurement process based on the sensing measurement request.

The sensing measurement process includes a measurement announcement sub-process and a sensing measurement sub-process.

In the measurement announcement sub-process, the first station 101 sends sensing measurement announcement information to the second station 102 based on the related information in the negotiated sensing measurement sub-process, to indicate the second station 102 to perform the sensing measurement sub-process next. In some embodiments, the sensing measurement announcement information carries information such as a quantity of times of sensing measurement and/or sensing measurement termination information, to notify the second station 102 of information such as the quantity of times of sensing measurement and/or the sensing measurement termination information in the sensing measurement sub-process.

In the sensing measurement sub-process, the first station 101 and the second station 102 perform sensing measurement for a plurality of times. In each sensing measurement, the first station 101 sends a first sounding frame to the second station 102, and the second station 102 sends a second sounding frame to the first station 101 after receiving the first sounding frame. The second station 102 determines N groups of first measurement results based on a plurality of first sounding frames received in the plurality of times of sensing measurement. The N groups of first measurement results are in a one-to-one correspondence with N first transmission paths. Each group of first measurement results includes an angle of arrival, relative time of flight, and a Doppler frequency shift of a corresponding first transmission path. The first transmission path is a path for transmitting the first sounding frame between the first station 101 and the second station 102. The first station 101 determines Z groups of second measurement results based on a plurality of second sounding frames received in the plurality of times of sensing measurement. The Z groups of second measurement results are in a one-to-one correspondence with Z second transmission paths. Each group of second measurement results includes an angle of arrival, relative time of flight, and a Doppler frequency shift of a corresponding second transmission path. The second transmission path is a path for transmitting the second sounding frame between the second station 102 and the first station 101.

In the result exchange process, the second station 102 sends the N groups of first measurement results to the first station 101, and the first station 101 determines the location and the instantaneous speed of the passive target 103 based on the N groups of first measurement results and the Z groups of second measurement results. The passive target 103 is located on the transmission path.

In some embodiments, it should be noted that the foregoing negotiation process is an optional process. To be specific, the process may be performed before the sensing measurement process, or the process may not be performed. This is not specially limited in this application. In some embodiments, the measurement announcement sub-process in the foregoing sensing measurement process is an optional process. To be specific, the sub-process may be performed in the sensing measurement process, or the sub-process may not be performed. This is not specially limited in this embodiment of this application.

The following describes the foregoing three processes in detail.

The negotiation process is as follows:

The first station 101 sends the sensing measurement request to the second station 102. The sensing measurement request carries a time period in which the first station 101 can perform sensing measurement, channel information, and a maximum quantity of times of sensing measurement that can be performed between the first station 101 and the second station 102. The channel information includes a center frequency and a channel bandwidth. The center frequency is a center carrier frequency. The channel information is sent, so that the second station 102 determines, based on the channel information, related information of a channel for communicating with the first station 101.

The second station 102 receives the sensing measurement request, and in response to the sensing measurement request, determines, based on a time period in which the first station 101 can perform sensing measurement and a time period in which the second station 102 can perform sensing measurement, an overlap between the time period in which the first station 101 can perform sensing measurement and the time period in which the second station 102 can perform sensing measurement, namely, a first time period. Then, the second station 102 sends response information to the first station 101. The response information carries the first time period. The first station 101 receives the response information, and obtains the first time period from the response information.

In another embodiment of this application, the sensing measurement request may further carry information such as a quantity of space-time streams. This is not specially limited in this embodiment of this application.

The sensing measurement request may be, for example, a sensing measurement request frame, and the response information may be, for example, a sensing measurement response frame. This is not specially limited in this embodiment of this application.

Figure 2:
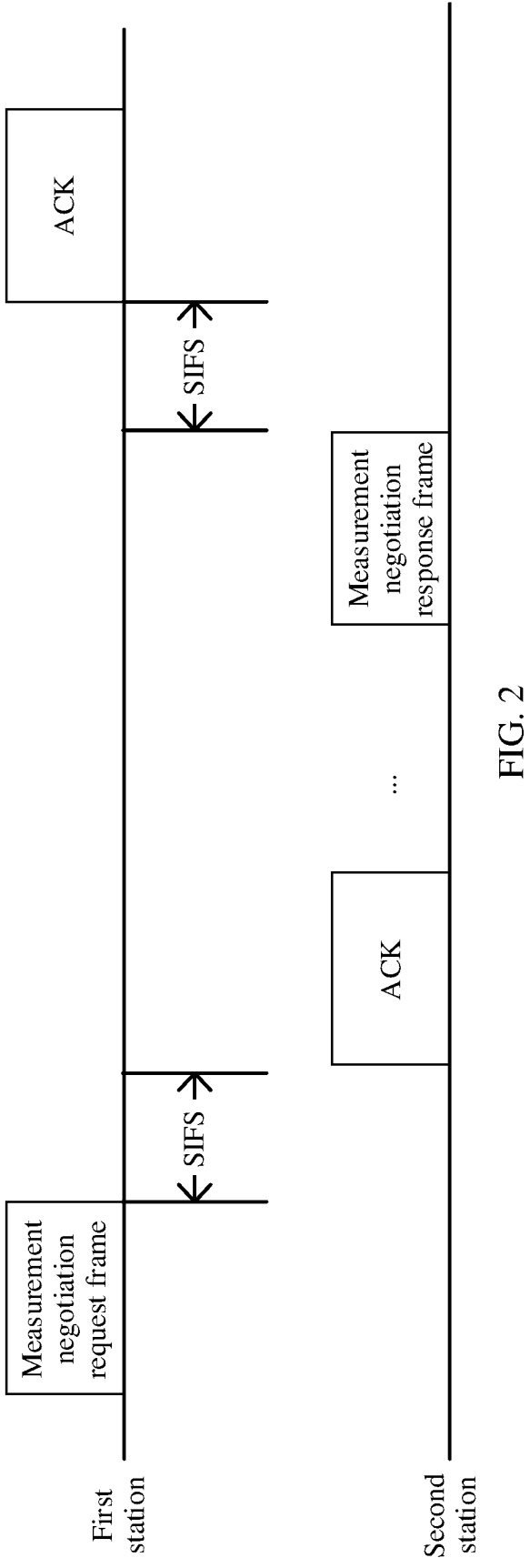
FIG. 2 is a schematic diagram of a sensing measurement negotiation process according to at least one embodiment of this application.

With reference to FIG. 2, the following describes the sensing measurement negotiation process by using an example in which the sensing measurement request is the sensing measurement request frame and the response information is the sensing measurement response frame.

The first station 101 sends the sensing measurement request frame to the second station 102.

In some embodiments, after receiving the sensing measurement request frame, the second station 102 replies an ACK frame (an acknowledgment frame) to the first station 101 after an SIFS.

The second station 102 sends the sensing measurement response frame to the first station 101 based on the sensing measurement request frame.

In some embodiments, the first station 101 receives the sensing measurement response frame, and replies an ACK frame (an acknowledgment frame) to the second station 102 after an SIFS. The SIFS is a short interframe space.

It can be learned from the foregoing that the first station 101 sends the sensing measurement request to the second station 102, to negotiate with the second station 102 about related information on sensing measurement, to ensure that the subsequent sensing measurement process can be smoothly performed. The second station 102 sends the response information to the first station 101, to be specific, sends a negotiation result to the first station 101, so that the first station 101 obtains the negotiation result based on the response information, to start the sensing measurement process based on the negotiation result.

The sensing measurement process is as follows.

For the measurement announcement sub-process:

The first station 101 sends the sensing measurement announcement information to the second station 102, where the sensing measurement announcement information indicates the second station 102 to perform sensing measurement. The second station 102 receives the sensing measurement announcement information, and performs sensing measurement with the first station 101 in response to the sensing measurement announcement information.

It can be learned from the foregoing that the first station 101 sends the sensing measurement announcement information to the second station 102, to indicate the second station 102 to perform the sensing measurement. In this way, after receiving the sensing measurement announcement information, the second station 102 may make preparations in advance, to better complete sensing measurement between the second station 102 and the first station 101.

An occasion on which the first station 101 sends the sensing measurement announcement information to the second station 102 may be, for example, a first moment. The first moment is one moment in the first time period. In other words, the first station 101 sends the sensing measurement announcement information to the second station 102 at the first moment. It should be noted that the occasion on which the first station 101 sends the sensing measurement announcement information to the second station 102 is only an example, and is not intended to limit this application. For example, if the negotiation process is not performed, the first station 101 sends the sensing measurement announcement information to the second station 102 when the first station 101 needs to sense the location and the instantaneous speed of the passive target 103.

In some embodiments, the sensing measurement announcement information further may carry a quantity M of times of sensing measurement and/or sensing measurement termination information. The quantity M of times of sensing measurement or the sensing measurement termination information or both are carried, so that the second station 102 quickly determines, based on the quantity M of times of sensing measurement and/or the sensing measurement termination information, a trigger condition for stopping sensing measurement. Further, in the sensing measurement process, if the second station 102 detects that the trigger condition is triggered (to be specific, the quantity of times of sensing measurement reaches M or a measurement status meets the sensing measurement termination information), the second station 102 stops sensing measurement.

The sensing measurement announcement information may be sent in a media access control (media access control) frame. The following describes a manner of carrying the sensing measurement announcement information in a null data packet announcement frame by using an example in which the MAC frame is the null data packet announcement frame (NDPA frame).

First, the following describes a format of a null data packet announcement frame defined in the 802.11ax protocol. As shown in FIG. 3a, the null data packet announcement frame defined in the 802.11ax protocol includes a frame control field, a duration field, a receiver address field, a transmitter address field, a sounding dialog token field, n station information fields, a station information security authentication code field, and a frame check sequence field.

The frame control field indicates a type of the null data packet announcement frame.

The duration field indicates duration of the null data packet announcement frame.

The receiver address field indicates an address of a receive end.

The transmitter address field indicates an address of a transmit end.

The sounding dialog token field indicates a number of a current measurement, to be specific, indicates which measurement is the current measurement. As shown in FIG. 3b, the sounding dialog token field includes a ranging sub-field, an HE/VHT sub-field, and a sounding dialog token sub-field. The ranging subfield indicates that a sent frame is a frame used for ranging, the HE/VHT subfield indicates a version of the standard, and the sounding dialog token subfield indicates the number of the current measurement, to indicate specific measurement that is the current measurement.

As shown in FIG. 3c, each station information field includes an association identifier subfield, an offset subfield, a responder-to-initiator space-time stream quantity subfield, a responder-to-initiator repetition count subfield, an initiator-to-responder space-time stream quantity subfield, a first reserved subfield, a disambiguation subfield, an initiator-to-responder repetition count subfield, and a second reserved subfield.

The association identifier subfield indicates a number of the responder (receive end).

The offset subfield indicates an identifier of a standard LTF.

The responder-to-initiator space-time stream quantity subfield indicates a quantity of independent information between the responder and the initiator (transmit end).

The responder-to-initiator repetition count subfield indicates a quantity of LTFs included in a frame sent by the responder to the initiator and a transmission repetition count.

The initiator-to-responder space-time stream quantity subfield indicates the quantity of independent information between the initiator and the responder.

The disambiguation subfield is set to 1.

The initiator-to-responder repetition count subfield indicates a quantity of LTFs included in a frame sent by the initiator to the responder and a transmission repetition count.

The first reserved subfield and the second reserved subfield are reserved bits in the station information field.

The station information security authentication code field indicates information about security verification by the receive end and the transmit end.

The frame check sequence field indicates a check sequence of a frame, to verify whether the frame is changed.

It should be noted that a number below each field in FIG. 3a indicates a quantity of bytes of each field. A number below each subfield in FIG. 3b and FIG. 3c indicates a quantity of bits in each subfield. English names are provided below Chinese names of the fields or subfields in FIG. 3a, FIG. 3b, and FIG. 3c.

To carry the sensing measurement announcement information, values of some fields of the null data packet announcement frame defined in the 802.11ax are redefined or modified in embodiments of this application. For example, if the sensing measurement announcement information carries either of the quantity M of times of sensing measurement and the sensing measurement termination information, the null data packet announcement frame carries the sensing measurement announcement information in the following five manners.

In a first manner, a value of a frame type subfield in the frame control field in the null data packet announcement frame is a fourth value, indicating the second station to perform sensing measurement, so that the second station starts to perform sensing measurement after receiving the null data packet announcement frame. In other words, a new sensing measurement NDPA frame is added to a frame subtype indication type of the frame control field in the NDPA frame, and a new value of the frame subtype indicates the new sensing measurement NDPA frame. The new value may be a value that is not defined or used in the 802.11ax.

A value of any subfield in the station information field in the null data packet announcement frame is the quantity M of times of the sensing measurement or the sensing measurement termination information. To be specific, any subfield in the station information field is customized, and the customized subfield indicates the quantity M of times of sensing measurement or the sensing measurement termination information.

It should be noted that, if a value of the association identifier subfield in the station information field is set as the quantity M of times of sensing measurement or the sensing measurement termination information, an association identifier subfield in another station information field needs to indicate a number of the second station.

In a second manner, a value of a reserved bit in the sounding dialog token (sounding dialog token) field in the null data packet announcement frame is a fifth value, indicating the second station to perform sensing measurement. In other words, a new sensing measurement NDPA frame is defined in a reserved bit in the sounding dialog token field in the NDPA frame, and a new value of the reserved bit in the sounding dialog token field indicates the newly defined sensing measurement NDPA frame. The new value may be a value that is not defined or used in the 802.11ax.

A value of any subfield in the station information field in the null data packet announcement frame is the quantity M of times of the sensing measurement or the sensing measurement termination information. To be specific, any subfield in the station information field is customized, and the customized subfield indicates the quantity M of times of sensing measurement or the sensing measurement termination information.

It should be noted that, if a value of the association identifier subfield in the station information field is set as the quantity M of times of a sensing measurement report or sensing measurement report termination information, an association identifier subfield in another station information field needs to indicate a number of the second station.

In a third manner, a value of some reserved bits in the station information field in the null data packet announcement frame is a sixth value, indicating the second station to perform sensing measurement, and some reserved bits carry the sensing measurement termination information. In other words, a new sensing measurement NDPA frame is defined in some reserved bits in the STA info field in the NDPA frame, and a new value of some reserved bits in the STA info field in the NDPA frame indicates the newly defined sensing measurement NDPA frame. The new value may be a value that is not defined or used in the 802.11ax.

In a fourth manner, a value of a reserved bit in one station information field in the null data packet announcement frame is a seventh value, indicating the second station to perform sensing measurement, and a reserved bit in another station information field in the null data packet announcement frame carries the quantity M of times of the sensing measurement or the sensing measurement termination information. In other words, a new sensing measurement NDPA frame is defined in a reserved bit in the STA info field in the NDPA frame, and a new value of the reserved bit in the STA info field indicates the newly defined sensing measurement NDPA frame.

In a fifth manner, a value of an association identifier subfield in the station information field in the null data packet announcement frame is any integer ranging from 2008 to 2047, indicating the second station to perform sensing measurement. In other words, a new sensing measurement NDPA frame is defined in AID 11/RID 11 of the STA info field in the NDPA frame, and a new value of AID 11/RID 11 indicates the new sensing measurement NDPA frame. The new value may be a value that is not defined or used in the 802.11ax.

Another field in the station information field carries the quantity M of times of the sensing measurement or the sensing measurement termination information. It should be noted that, because the association identifier subfield in the station information field in the null data packet announcement frame indicates the second station to perform sensing measurement, an association identifier subfield in another station information field in the null data packet announcement frame is used to indicate a number of the second station.

It should be noted that the foregoing five manners are only an example, and is not intended to limit this application.

For the sensing measurement sub-process, the first station 101 and the second station 102 perform M sensing measurements.

An occasion on which the first station 101 performs the M sensing measurements with the second station 102 is:

If the first station 101 sends the sensing measurement announcement information to the second station 102, the first station 101 performs the M sensing measurements with the second station 102 after sending the sensing measurement announcement information to the second station 102.

If the first station 101 does not send the sensing measurement announcement information to the second station 102 and executes the negotiation process, the first station 101 performs the M sensing measurements with the second station 102 in the first time period.

If the first station 101 neither executes the negotiation process nor sends the sensing measurement announcement information, the first station 101 performs the M sensing measurements with the second station 102 when needing to sense the location and the instantaneous speed of the passive target 103.

It should be noted that the occasion on which the first station 101 performs the M sensing measurements with the second station 102 is only an example, and is not intended to limit this application.

For example, a manner of determining the quantity M of times of sensing measurement that can be performed by the first station 101 and the second station 102 may be: the first station 101 determines, based on a maximum quantity of times of sensing measurement that can be performed by the first station 101 and the second station 102, the quantity M of times of sensing measurement that can be performed by the first station 101 and the second station 102. It should be noted that, for measurement accuracy, a value of M may be set as large as possible within an allowed range. The first station 101 may send the sensing measurement announcement information to the second station 102, where the sensing measurement announcement information carries information such as the quantity M of times of sensing measurement, to notify the second station 102 of the quantity of times of sensing measurement.

A process in which the first station 101 performs the M sensing measurements with the second station 102 is as follows:

For single sensing measurement performed by the first station 101 and the second station 102, a process of the sensing measurement includes: The first station 101 sends a first sounding frame to the second station 102, the second station 102 receives the first sounding frame and sends a second sounding frame to the first station 101, and the first station 101 receives the second sounding frame.

The first sounding frame is used by the second station to measure a channel between the first station and the second station, to obtain channel state information. The second sounding frame is used by the first station to measure a channel between the second station and the first station, to obtain channel state information. The first sounding frame and the second sounding frame may be, for example, null data packet (NDP, Null data packet) frames, or may be other frames including preamble sequence frames, or certainly may be data frames. This is not specially limited in this embodiment of this application.

The foregoing single sensing measurement process is repeated until a quantity of times of sensing measurement reaches M, so that the M sensing measurements between the first station 101 and the second station 102 can be completed.

It should be noted that, the first station 101 sends the first sounding frame in an omnidirectional transmission manner, and the second station 102 also sends the second sounding frame in the omnidirectional transmission manner. Compared with a directional manner, the omnidirectional transmission manner is used for sending the sounding frame, so that repeated scanning in the plurality of different directions is not required to complete sounding of the passive target. This also avoids low precision of an angle of departure of a sounding signal caused by poor directivity of the sounding signal, and resolves a problem that a large-aperture antenna, low frequency, and wide beam are required for sending the sounding frame in the directional manner.

The first sounding frame may be transmitted from the first station 101 to the second station 102 through a line of sight 104 between the first station 101 and the second station 102. Alternatively, the first sounding frame may be transmitted from the first station 101 to the passive target 103, and then transmitted to the second station 102 after being reflected by the passive target 103. The second sounding frame may be transmitted from the second station 102 to the first station 101 through the line of sight 104 between the first station 101 and the second station 102. Alternatively, the second sounding frame may be transmitted from the second station 102 to the passive target 103, and then transmitted to the first station 101 after being reflected by the passive target 103.

Because of existence of a short interframe space (SIFS, short interframe space), to be specific, existence of a minimum interval between adjacent frames, after receiving the first sounding frame, the second station 102 sends the second sounding frame to the first station 101 when a preset interval elapses, and after receiving the second sounding frame, the first station 101 sends a first sounding frame (to be specific, a first sounding frame sent in next sensing measurement) to the second station 102 when a preset interval elapses. In other words, an interval between two adjacent sensing measurements is the preset interval, and the preset interval is greater than or equal to the short interframe space.

Figure 4:
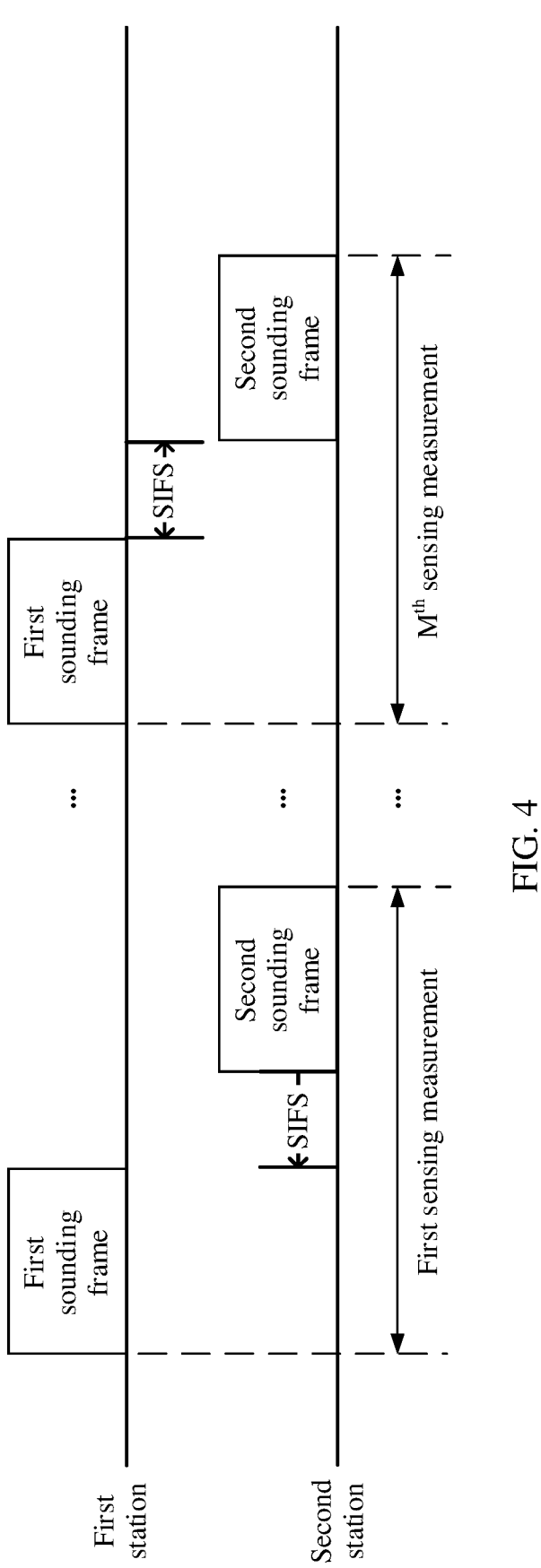
FIG. 4 is a schematic diagram of M sensing measurements between a first station and a second station according to at least one embodiment of this application.

Based on this, as shown in FIG. 4, a process of the M sensing measurements between the first station 101 and the second station 102 is described by using an example in which the preset interval is equal to the short interframe space.

The first station 101 sends the first sounding frame to the second station 102. The second station 102 sends the second sounding frame to the first station 101 when an SIFS elapses after receiving the first sounding frame. The first station 101 receives the second sounding frame. When an SIFS elapses, the foregoing process is repeated until the M sensing measurements are completed.

It should be noted that, in the foregoing process, the sensing measurement announcement information may be further sent in each sensing measurement, or in last sensing measurement, to indicate the second station to stop the sensing measurement process.

In another embodiment of this application, a process in which the first station 101 performs the M sensing measurements with the second station 102 may be as follows.

The first station 101 sends one sensing measurement trigger frame to the second station 102. The second station 102 sends the second sounding frame to the first station 101 when the preset interval elapses after receiving the sensing measurement trigger frame. The first station 101 sends the sensing measurement announcement frame to the second station 102 when the preset interval elapses after receiving the second sounding frame. Then, the first station 101 sends the first sounding frame to the second station 102 when the preset interval elapses again, and the second station 102 receives the first sounding frame. In this case, one sensing measurement is completed. The foregoing process is repeated until the M sensing measurements are completed. It should be noted that an interval between the two adjacent sensing measurements is one preset interval. The preset interval is greater than or equal to the short interframe space.

After completing the M sensing measurements, the first station 101 receives M second sounding frames, and the second station 102 receives M first sounding frames. The first station 101 obtains channel state information (CSI) based on the M second sounding frames, and determines Z groups of second measurement results based on the obtained channel state information. The Z groups of second measurement results are in a one-to-one correspondence with Z second transmission paths. Each group of second measurement results includes an angle of arrival, relative time of flight, and a Doppler frequency shift of a corresponding second transmission path.

Similarly, the second station 102 obtains channel state information (CSI) based on the M first sounding frames, and determines N groups of first measurement results based on the obtained channel state information. The N groups of first measurement results are in a one-to-one correspondence with N first transmission paths. Each group of first measurement results includes an angle of arrival, relative time of flight, and a Doppler frequency shift of a corresponding first transmission path.

It should be noted that an angle of arrival of a transmission path means a direction in which a sounding frame on the transmission path enters a station.

The first transmission path is a path for transmitting the first sounding frame between the first station 101 and the second station 102. Several paths shown in FIG. 1 are used as an example. The path for transmitting the first sounding frame between the first station 101 and the second station 102 may include a line of sight 104 between the first station 101 and the second station 102, and a reflection path 105 that passes through the passive target 103.

The second transmission path is a path for transmitting the second sounding frame between the second station 102 and the first station 101. Several paths shown in FIG. 1 are used as an example. The path for transmitting the second sounding frame between the second station 102 and the first station 101 includes a line of sight 104 between the second station 102 and the first station 101, and a reflection path 105 that passes through the passive target 103.

It should be noted that, if the first station 101 sends the sensing measurement announcement information to the second station 102, due to existence of the short interframe space, the first station 101 starts performing the M sensing measurements with the second station 102, in other words, sends the first sounding frame, when the preset interval elapses after sending the sensing measurement announcement information to the second station 102. The preset interval is greater than or equal to the short interframe space.

The following uses an example in which both the first sounding frame and the second sounding frame are NDP frames, and the first sounding frame and the second sounding frame are transmitted in an orthogonal frequency division multiplexing mode and describes a principle in which the first station 101 obtains channel state information (CSI) from each second sounding frame and determines the Z groups of second measurement results based on the channel state information obtained from the M second sounding frames. Because both the first sounding frame and the second sounding frame are NDP frames, the first sounding frame is a first NDP frame, and the second sounding frame is a second NDP frame.

Figure 5:
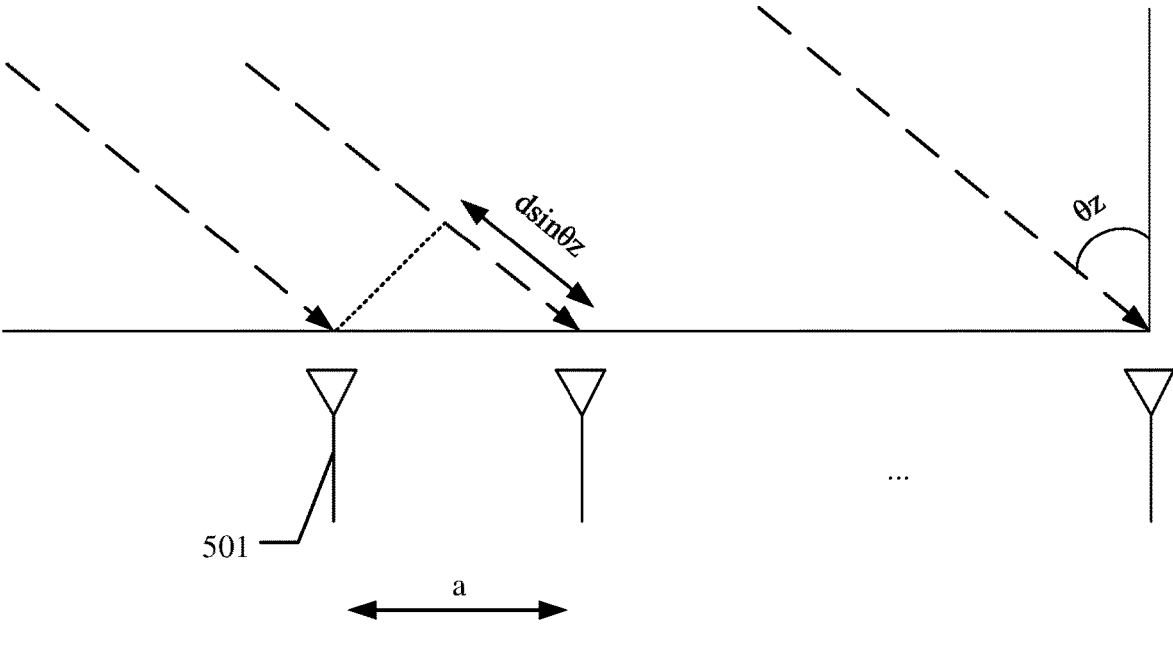
FIG. 5 is a schematic diagram of an antenna of a first station according to at least one embodiment of this application.

As shown in FIG. 5, assuming that a distance between adjacent antennas 501 of the first station is a, and an angle of arrival of a $z^{th}$ second transmission path is $\theta_z$, a phase difference between channel state information (CSI) between adjacent antennas of a second NDP frame on the $z^{th}$ second transmission path is:

$$\Phi_z = e^{-j2\pi\frac{d}{\lambda}\sin\theta_z} \tag{1}$$

$\Phi_z$ is the phase difference between the CSI between the adjacent antennas of the second NDP frame on the $z^{th}$ second transmission path. $\lambda$ is a carrier wavelength of the second NDP frame on the $z^{th}$ second transmission path. z indicates a number of the second transmission path. $1 \le z \le Z$. Z is a quantity of second transmission paths. It should be noted that Z herein is an assumed value, and an actual value of Z is obtained through calculation.

Assuming that a frequency spacing between adjacent subcarriers of the second NDP frame is $\Delta f$, time of flight ToF is $\tau_z$, and a phase difference between the adjacent subcarriers of the second NDP frame on the $z^{th}$ second transmission path is:

$$\Omega_z = e^{-j2\pi\Delta f\tau_z} \tag{2}$$

$\Omega_z$ is a phase difference between the adjacent subcarriers of the second NDP frame on the $z^{th}$ second transmission path when the time of flight ToF is $\tau_z$. $\tau_z$ is time of flight ToF of the second NDP frame on the $z^{th}$ second transmission path. j is an imaginary unit.

A Doppler frequency shift occurring after the second NDP frame on the $z^{th}$ second transmission path is reflected by a passive target on the $z^{th}$ second transmission path is:

$$f_{D_z} = \frac{v_z}{\lambda} \tag{3}$$

$v_z$ is a speed component of the passive target on the $z^{th}$ second transmission path along an angular bisector of a reflection angle. The reflection angle is an angle formed by a line segment formed by the first station and the passive target on the $z^{th}$ second transmission path and a line segment formed by the second station and the passive target on the $z^{th}$ second transmission path.

The Doppler frequency shift causes the following phase difference between CSI of two adjacent second NDP frames on the $z^{th}$ second transmission path:

$$D_z = e^{-j2\pi f_{D_z}\Delta T} \tag{4}$$

$D_z$ is the phase difference between the CSI of the two adjacent second NDP frames on the $z^{th}$ second transmission path caused by the Doppler frequency shift. $\Delta T$ is an interval between the two adjacent second NDP frames on the $z^{th}$ second transmission path.

Overlapping $CSI_{i,b,k}$ of a $k^{th}$ subcarrier corresponding to a $b^{th}$ antenna in an $i^{th}$ measurement on the $z^{th}$ second transmission paths is:

$$CSI_{i,b,k} = [\alpha_1 \quad \alpha_2 \quad \cdots \quad \alpha_Z]\begin{bmatrix} D_1^{i-1}\Phi_1^{b-1}\Omega_1^k \\ D_2^{i-1}\Phi_2^{b-1}\Omega_2^k \\ \vdots \\ D_Z^{i-1}\Phi_Z^{b-1}\Omega_Z^k \end{bmatrix} \tag{5}$$

$\alpha_z$ is amplitude attenuation corresponding to the second NDP frame on the $z^{th}$ second transmission path.

CSI on K adjacent subcarriers and B adjacent antennas in M consecutive measurements is combined into a vector with a length of M\*K\*B:

$$[CSI(i)^T CSI(i+1)^T \ldots CSI(i+M-1)^T]$$

$$CSI(i)=[CSI_{i,b,k}CSI_{i,b,k+1} \ldots CSI_{i,b,k+K-1}CSI_{i,b+1,k}C-SI_{i,b+1,k+1} \ldots CSI_{i,b+K-1,k+K-1}]^T \tag{6}$$

A matrix MKB×P obtained by traversing all possible combinations and arranging obtained vectors side by side is denoted as C, where P is all possible combinations, and P≥MKB. The matrix C may be decomposed into:

$$C=SX \tag{7}$$

S herein is one MKB×Z matrix. X is a Z×P matrix. A $z^{th}$ column of the matrix S may be written as:

$$S_z = [\, R^T \quad D_z R^T \quad \cdots \quad D_z^{M-1} R^T \,] \tag{8}$$

$$R = [\, 1 \quad \Omega_z \quad \cdots \quad \Omega_z^{z-1} \quad \Phi_z \quad \Omega_z \Phi_z \quad \cdots \quad \Omega_z^{z-1}\Phi_z^{B-1} \,]^T$$

Therefore, the following may be obtained by performing SVD on the matrix C:

$$SVD(C)=U\Sigma V^H \tag{9}$$

If a feature vector corresponding to a smaller singular value in the matrix U is selected to construct a matrix E, a spectrum value of an angle of arrival, relative time of flight, and a Doppler frequency shift may be calculated in the following manner:

$$P(\theta, \tau, f_D) = \frac{1}{\vec{d}^{H}(\theta, \tau, f_D)EE^H\vec{d}(\theta, \tau, f_D)} \tag{10}$$

A vector $$\overrightarrow{(a)}(\theta, \tau, f_D) = \left[\, \vec{r}^{T} \quad e^{-j2\pi f_D \Delta T}\vec{r}^{T} \quad \cdots \quad e^{-j2\pi f_D(M-1)\Delta T}\vec{r}^{T} \right]$$

$$\vec{r} = \left[\, 1 \quad e^{-j2\pi\Delta f\tau} \quad \cdots \quad e^{-j2\pi\Delta f(z-1)\tau} \quad e^{-j2\pi\frac{a}{\lambda}\sin\theta} \quad e^{-j2\pi\Delta f\tau}e^{-j2\pi\frac{a}{\lambda}\sin\theta} \quad \cdots \quad e^{-j2\pi\Delta f(Z-1)\tau}e^{-j2\pi\Delta f\tau}(e)^{-j2\pi\frac{a}{\lambda}\sin\theta} \right]^T$$

One peak in the spectrum value $P(\theta, \tau, f_D)$ corresponds to one second transmission path. Corresponding $\theta$, $\tau$, and $f_D$ at the peak corresponds to an angle of arrival, relative time of flight, and a Doppler frequency shift of a corresponding second transmission path. Therefore, the spectrum value $P(\theta, \tau, f_D)$ is solved, and corresponding $\theta$, $\tau$, and $f_D$ at the peak in the spectrum value $P(\theta, \tau, f_D)$ are determined as the angle of arrival, the relative time of flight, and the Doppler frequency shift of the second transmission path corresponding to the peak. A quantity of second transmission paths is equal to a quantity of peaks in the spectrum value $P(\theta, \tau, f_D)$.

It should be noted that, a principle of calculating the angle of arrival, the relative time of flight, and the Doppler frequency shift of the first transmission path is the same as a principle of calculating the angle of arrival, the relative time of flight, and the Doppler frequency shift of the second transmission path. Therefore, details are not described herein again.

It can be learned from the foregoing that, the M sensing measurements between the first station and the second station are performed, to be specific, the first station sends the first sounding frame to the second station for a plurality of times in an omnidirectional manner, so that the first measurement can cover as many transmission paths between the first station and the second station as possible. Similarly, the second station sends the second sounding frame to the first station for a plurality of times in an omnidirectional manner, so that the second sounding frame can cover as many transmission paths between the second station and the first station as possible. In this way, the Z groups of measurement results determined by the first station based on the plurality of received second sounding frames correspond to as many transmission paths from the second station to the first station as possible, and the N groups of measurement results determined by the second station based on the plurality of received first sounding frames correspond to as many transmission paths from the first station to the second station as possible. In other words, path information of as many passive targets as possible on the transmission path can be detected. This can determine locations and instantaneous speeds of a plurality of passive targets.

A result exchange process is as follows:

After calculating the N groups of first measurement results, the second station 102 needs to send the N groups of first measurement results to the first station 101, so that the first station 101 determines the location and the instantaneous speed of the passive target 103 based on the N groups of first measurement results and the Z groups of second measurement results. FIG. 6 is a schematic flowchart of a sensing measurement report exchange method according to an embodiment of this application. As shown in FIG. 6, a process of determining a location and an instantaneous speed of a passive target 103 includes the following steps.

S601: A second station 102 generates sensing measurement report information based on N groups of first measurement results. The N groups of first measurement results are in a one-to-one correspondence with N first transmission paths between a first station 101 and the second station 102. One group of first measurement results includes an angle of arrival, relative time of flight, and a Doppler frequency shift of a corresponding first transmission path.

It should be noted that, in another embodiment, the second station 102 may further send round trip time of a last sensing measurement in M sensing measurements to the first station 101.

In this embodiment of this application, the N first transmission paths between the first station 101 and the second station 102 are transmission paths of the first sounding frame between the first station 101 and the second station 102. The transmission path of the first sounding frame between the first station 101 and the second station 102 are described above. Therefore, details are not described herein again. It should be noted that N is an integer greater than 0.

The sensing measurement report information may further include measurement result group quantity information. The measurement result group quantity information indicates a group quantity N of the first measurement results. In this case, after receiving the sensing measurement report information, the first station quickly determines, based on the measurement result group quantity information carried in the sensing measurement report information, the group quantity of the first measurement results carried in the measurement result group quantity information.

The sensing measurement report information may further include report type information. The report type information indicates a type of the sensing measurement report information. In this way, after receiving the sensing measurement report information, the first station may quickly determine, based on the report type information carried in the sensing measurement report information, that the received information is the sensing measurement report information.

The sensing measurement report information may further include carrier frequency offset parameter information. The carrier frequency offset parameter information indicates a carrier frequency offset. It should be noted that the carrier frequency offset is a pre-estimated error value, and the carrier frequency offset may be used to correct a frequency of a carrier that carries the sensing measurement report information.

On this basis, the sensing measurement report information may further include at least one of public action information, dialog token information, time of departure, time of arrival, a time of departure error, a time of arrival error, and a secure LTF parameter.

The dialog token information indicates a number of a current dialog with the first station, to be specific, indicates to the first station that a specific dialog is the current dialog.

The time of departure indicates time of sending the sensing measurement report information sent by the second station.

The time of arrival indicates time of arrival of information sent by a peer station to the second station.

The time of departure error indicates accuracy of the time of departure, and is a pre-estimated error value.

The time of arrival error indicates accuracy of the time of arrival, and is a pre-estimated error value.

The sensing measurement report information is used to determine a location and an instantaneous speed of a passive target.

The sensing measurement report information may be sent in a media medium. The media medium may be, for example, a location measurement report frame, a predefined frame, or a predefined element. This is not specially limited in this application. The following uses an example to describe a manner of carrying the sensing measurement report information in the media medium.

For example, if the location measurement report frame (LMR frame) carries the sensing measurement report information, the LMR frame carries the sensing measurement report information in the following manner:

A measurement result group quantity field and a measurement result field are added to the LMR frame. In this way, a structure of the LMR frame is shown in FIG. 7, including a type field, a public action field, a dialog token field, a time of departure field, a time of arrival field, a time of departure error, a time of arrival error field, a carrier frequency offset parameter field, a secure LTF parameter field, a measurement result group quantity field, and a measurement result field.

A value of the type field is a first value, and the first value indicates that a type of the location measurement report frame is a sensing measurement report frame. A value of the measurement result field is the N groups of first measurement results in the sensing measurement report information. A value of the measurement result group quantity field is the group quantity N of the first measurement results in the sensing measurement report information. A value of the carrier frequency offset parameter field is a carrier frequency offset of the sensing measurement report information.

A value of another field in the LMR frame is corresponding information in the sensing measurement report information, and details are not described herein again.

It should be noted that a number below each field in FIG. 7 indicates a quantity of bytes of a corresponding field, and each byte has 8 bits. An English name is shown below a Chinese name of each field in FIG. 7.

For another example, if the predefined frame carries the sensing measurement report information, a related carrying manner is as follows:

One predefined frame is set based on a design requirement, and the sensing measurement report information is carried in the predefined frame. As shown in FIG. 8, the predefined frame includes a type field, a measurement result field, a measurement result group quantity field, a carrier frequency offset parameter field, a public action field, and a dialog token field.

A value of the type field is a second value, and the second value indicates that a type of the predefined frame is a sensing measurement report frame. A value of the measurement result field is the N groups of first measurement results in the sensing measurement report information. A value of the measurement result group quantity field is the group quantity N of the first measurement results in the sensing measurement report information. A value of the carrier frequency offset parameter field is a carrier frequency offset of the sensing measurement report information.

A value of another field in the predefined frame is corresponding information in the sensing measurement report information, and details are not described herein again.

It should be noted that a number below each field in FIG. 8 indicates a quantity of bytes of a corresponding field, and each byte has 8 bits. An English name is shown below a Chinese name of each field in FIG. 8.

For another example, if the predefined element carries the sensing measurement report information, a related carrying manner is as follows:

One predefined element is set based on a design requirement, and the sensing measurement report information is carried in the predefined element. As shown in FIG. 9, the predefined element may include an element identifier field, a measurement result field, a measurement result group quantity field, a carrier frequency offset parameter field, an element length field, an element ID extension field, and a dialog token field.

A value of the element identifier field is a third value, and the third value indicates that a type of the predefined element is a sensing measurement report element. A value of the measurement result field is the N groups of first measurement results in the sensing measurement report information. A value of the measurement result group quantity field is the group quantity N of the first measurement results in the sensing measurement report. A value of the carrier frequency offset parameter field is a carrier frequency offset of the sensing measurement report information. A value of the element length field is a preset length of the element. A value of the element ID extension field is a subtype of element extension. A value of the dialog token field is dialog token information in the sensing measurement report.

A number below each field in FIG. 9 indicates a quantity of bytes of a corresponding field, and each byte has 8 bits. An English name is shown below a Chinese name of each field in FIG. 9.

It should be noted that the first value, the second value, and the third value may be set based on a communication rule or the like. This is not specially limited in this application. The foregoing manner in which the media medium carries the sensing measurement report information is only an example, and is not intended to limit this application.

S602: The second station sends the sensing measurement report information to the first station.

In this embodiment of this application, if the sensing measurement report information is carried in the media medium, the second station sends, to the first station, the media medium that carries the sensing measurement report information.

S603: The first station receives the sensing measurement report information.

In this embodiment of this application, if the sensing measurement report information is carried in the media medium, the first station receives the media medium, and obtains the sensing measurement report information from the media medium.

S604: The first station obtains angles of arrival, relative time of flight, and Doppler frequency shifts of the N first transmission paths based on the sensing measurement report information.

It can be learned from the foregoing that, because the sensing measurement report information includes the N groups of first measurement results, and one measurement result includes an angle of arrival, relative time of flight, and a Doppler frequency shift of a corresponding first transmission path, the first station can determine, based on an angle of arrival, relative time of flight, and a Doppler frequency shift of each of the N first transmission paths in the N groups of first measurement results, locations and instantaneous speeds of passive targets corresponding to the N first transmission paths. This can implement measurement of locations and instantaneous speeds of a plurality of passive targets.

FIG. 10 is a schematic flowchart of determining a location and an instantaneous speed of a passive target by a first station according to an embodiment of this application; As shown in FIG. 10, the method includes the following steps.

Step 1001: Determine a first transmission path and a second transmission path of a same passive target based on angles of arrival ($\theta^1$ in FIG. 1), relative time of flight, and Doppler frequency shifts of N first transmission paths, and angles of arrival ($\theta^2$ in FIG. 1), relative time of flight, and Doppler frequency shifts of Z second transmission paths, to obtain a first transmission path and a second transmission path of each passive target.

In this embodiment of this application, the first transmission path is a path through which a first sounding frame passes when being transmitted between the first station and a second station, and the second transmission path is a path through which a second sounding frame passes when being transmitted between the second station and the first station. Therefore, there is an overlapped path between the first transmission path and the second transmission path. In this way, a first transmission path and a second transmission of a passive target on the overlapped path may be determined by determining the overlapping first transmission path and second transmission path.

Based on this, the overlapping first transmission path and second transmission path are obtained through matching based on the angles of arrival, the relative time of flight, and the Doppler frequency shifts of the N first transmission paths and the angles of arrival, the relative time of flight, and the Doppler frequency shifts of the Z second transmission paths, to be specific, the first transmission path and the second transmission path of the same passive target are determined.

Specifically, for the overlapping first transmission path and second transmission path, a direction of the first transmission path entering the second station is opposite to a direction of the second transmission path entering the first station, and relative time of flight and a Doppler frequency shift of the first transmission path are the same as those of the second transmission path. Therefore, a principle of determining the overlapping first transmission path and second transmission path is as follows: If both the relative time of flight and the Doppler frequency domain of the first transmission path are the same as those of the second transmission path, it is determined that the first transmission path overlaps the second transmission path. In this way, the first transmission path and the second transmission path of the same passive target may be obtained by matching the relative time of flight and the Doppler frequency shift of the first transmission path and the relative time of flight and the Doppler frequency shift of the second transmission path.

It should be noted that, if two passive targets are symmetric along a straight line connecting the first station 101 and the second station 102, although the two passive targets are at different locations, transmission paths passing through the two passive targets have a same distance. Therefore, four transmission paths passing through the two passive targets have same relative time of flight and Doppler frequency shift. In this way, when the overlapping first transmission path and second transmission path are matched, there is a case in which one first transmission path matches a plurality of second transmission paths, or one second transmission path matches a plurality of first transmission paths. For a case in which one first transmission path matches the plurality of second transmission paths, one first ray may be drawn in a direction opposite to the angle of arrival of the first transmission path, and one second ray may be drawn in a direction opposite to an angle of arrival of each second transmission path. If a focus exists between the first ray and the second ray, it is determined that a first transmission path corresponding to the first ray having the focus overlaps a second transmission path corresponding to the second ray having the focus. For a case in which one second transmission path matches the plurality of first transmission paths, a principle of determining the overlapping first transmission path and second transmission path is the same as that described above. Therefore, details are not described herein again.

Step 1002: Separately determine a location of each passive target based on an angle of arrival and relative time of flight of the first transmission path of each passive target, an angle of arrival and relative time of flight of the second transmission path of each passive target, and a location of the first station and/or a location of the second station.

In this embodiment of this application, an angle of arrival of a first transmission path of one passive target is an included angle between a horizontal line and a straight line connecting the passive target and the second station, and an angle of arrival of a second transmission path of one passive target is an included angle between a horizontal line and a straight line connecting the passive target and the first station.

Therefore, if the locations of the first station and the second station are known, one ray is drawn in a direction opposite to the angle of arrival of the second transmission path with the first station as an origin, one ray is drawn in a direction opposite to the angle of arrival of the first transmission path with the second station as an origin. An intersection point of the two rays is a location of the passive target.

If the location of the first station is known, the location of the second station is calculated based on the location of the first station, the relative time of flight, the angle of arrival of the first transmission path and the angle of arrival of the second transmission path, a line of sight between the first station and the second station, and a geometric principle. Then a location of the passive target is determined based on the locations of the second station and the first station, and the angle of arrival of the first transmission path and the angle of arrival of the second transmission path.

It should be noted that a principle of determining the location of the passive target when the location of the second station is known is the same as a principle of determining the location of the passive target when the location of the first station is known. Therefore, details are not described herein again.

Obviously, when the locations of the first station and the second station are known, the location of the passive target may be determined when there is no line of sight between the first station and the second station. While the location of either of the first station and the second station is known, the location of the passive target needs to be determined when there is a line of sight between the first station and the second station.

It should be noted that a principle of determining the location of each passive target is the same. Therefore, details are not described herein again.

Step 1003: Determine an instantaneous speed of each passive target based on a Doppler frequency shift of the first transmission path or a Doppler frequency shift of the second transmission path of each passive target and a carrier wavelength of the sounding frame.

In this embodiment of this application, for one passive target, a Doppler frequency shift of a first transmission path is the same as that of a second transmission path. Therefore, an instantaneous speed of the passive target is calculated based on the Doppler frequency shift of the first transmission path or that of the second transmission path of the passive target.

Specifically, the following formula is used:

$$v = \lambda * f_D$$

v is the instantaneous speed of the passive target. $\lambda$ is a carrier wavelength. $f_D$ is the Doppler frequency shift of the first transmission path or that of the second transmission path of the passive target.

In conclusion, the relative time of flight and the Doppler frequency shift of the first transmission path and the relative time of flight and the Doppler frequency shift of the second transmission path are matched, so that the overlapping first transmission path and second transmission path can be quickly determined, to be specific, the first transmission path and the second transmission path of the same passive target are determined. The location of the same passive target is determined based on angles of arrival and relative time of flight of the overlapping first transmission path and second transmission path. Location determining steps are simple and easy to perform. In addition, the instantaneous speed of the passive target may be calculated through the Doppler frequency shift of the first transmission path or the second transmission path of the passive target. The step is simple and easy to perform. In addition, because there are a plurality of first transmission paths and a plurality of second transmission paths, a plurality of transmission paths overlap in the plurality of first transmission paths and the plurality of second transmission paths. In addition, the passive target is on the transmission path. Therefore, locations and instantaneous speeds of a plurality of passive targets may be determined based on the plurality of first transmission paths and the plurality of second transmission paths. In addition, compared with a manner of determining a location of a target based on transmission time in some approaches, in this application, the location of the passive target is determined based on the relative time of flight and the angle of arrival of transmission on the first transmission path and the relative time of flight and the angle of arrival of the second transmission path. This can improve accuracy of a location measurement result of the passive target and robustness of a system.

Figure 11:
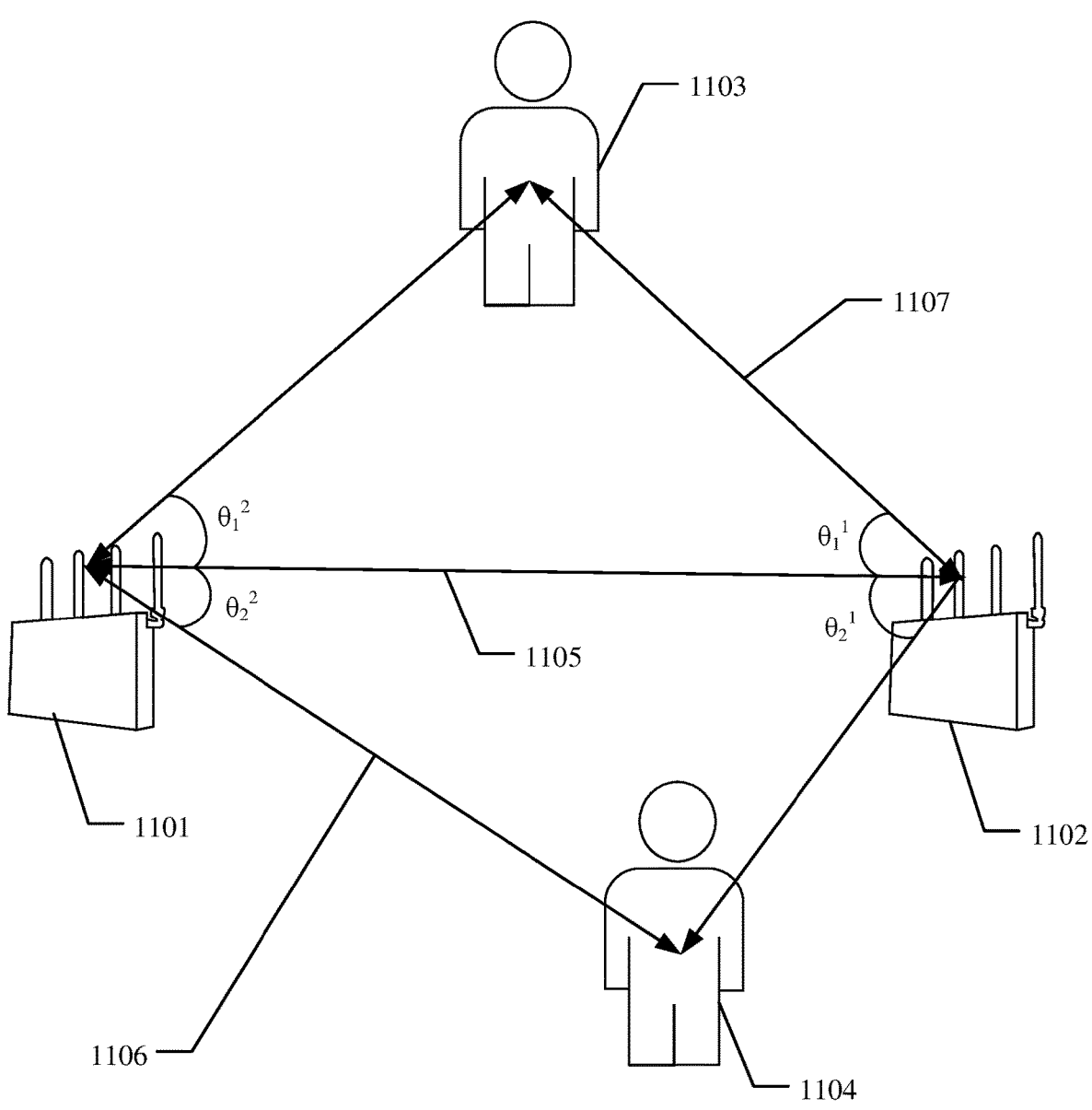
FIG. 11 is a second schematic diagram of an application scenario of sensing measurement according to at least one embodiment of this application.

The following uses an example in which a sensing measurement request is a sensing measurement request frame, response information based on the sensing measurement request is a sensing measurement response frame, a sensing measurement announcement frame is a null data packet announcement frame (NDPA frame), the first sounding frame is a first NDP frame (a first null data packet frame), the second sounding frame is a second NDP frame (a second null data packet frame), there are two passive targets between the first station and the second station, and the first station is a first Wi-Fi device and the second station is a second Wi-Fi device, and describes a process of determining a location and an instantaneous speed of a passive target in FIG. 11. In FIG. 11, there are two passive targets between the first Wi-Fi device 1101 and the second Wi-Fi device 1102: a passive target 1103 and a passive target 1104.

The first Wi-Fi device 1101 sends a sensing measurement request frame to the second Wi-Fi device 1102. The sensing measurement request frame carries a time period in which the first Wi-Fi device 1101 can perform sensing measurement, channel information, and a maximum quantity of times of sensing measurement that can be performed between the first Wi-Fi device 1101 and the second Wi-Fi device 1102. The second Wi-Fi device 1102 receives the sensing measurement request frame, sends an ACK frame to the first Wi-Fi device 1101 after an SIFS, and determines, based on information carried in the sensing measurement request frame, whether a request of the first Wi-Fi device 1101 is supported. If the request is supported, the second Wi-Fi device 1102 sends a sensing measurement response frame to the first Wi-Fi device 1101 based on the information carried in the sensing measurement request frame. The sensing measurement response frame carries a first time period, to be specific, an overlap between a time period in which the first Wi-Fi device 1101 can perform sensing measurement and a time period in which the second Wi-Fi device 1102 can perform sensing measurement. The first Wi-Fi device 1101 receives the sensing measurement response frame, and sends an ACK frame to the second Wi-Fi device after an SIFS. In this case, a negotiation process is completed.

When available time arrives, to be specific, when one moment in the first time period arrives, the first Wi-Fi device 1101 sends an NDPA frame to the second Wi-Fi device 1102, to indicate the second Wi-Fi device 1102 to perform sensing measurement next. In some embodiments, the NDPA frame carries a quantity of times of sensing measurement or measurement termination information, to notify the second Wi-Fi device 1102 of a quantity of times of repeated sensing measurement exchange or the measurement termination information.

The second Wi-Fi device 1102 receives the NDPA frame. The first Wi-Fi device 1101 sends a first NDP frame to the second Wi-Fi device 1102 when an SIFS elapses after sending an NDPA frame. The second Wi-Fi device 1102 receives the first NDP frame and sends a second NDP frame to the first Wi-Fi device 1101 after an SIFS. The first Wi-Fi device 1101 receives the second NDP frame, and then repeats the foregoing measurement process for a plurality of times. In a subsequent measurement process, the first Wi-Fi device 1101 does not send the NDPA frame to the second Wi-Fi device 1102, but directly sends an NDP frame, until a quantity of measurement times between the first Wi-Fi device 1101 and the second Wi-Fi device 1102 reaches a specified quantity of measurement times or a negotiated quantity of measurement times.

It should be noted that the first NDP frame may be transmitted from the first Wi-Fi device 1101 to the second Wi-Fi device 1102 through a line of sight 1105 between the first Wi-Fi device 1101 and the second Wi-Fi device 1102 and reflection paths (to be specific, a reflection path 1107 that passes through the passive target 1103 and a reflection path 1106 that passes through the passive target 1104) between the first Wi-Fi device 1101 and the second Wi-Fi device 1102. The second NDP frame may be transmitted from the second Wi-Fi device 1102 to the first Wi-Fi device 1101 through the line of sight 1105 between the first Wi-Fi device 1101 and the second Wi-Fi device 1102 and the reflection paths (to be specific, the reflection path 1107 that passes through the passive target 1103 and the reflection path 1106 that passes through the passive target 1104) between the first Wi-Fi device 1101 and the second Wi-Fi device 1102.

After completing a plurality of times of sensing measurement of the first Wi-Fi device 1101 and the second Wi-Fi device 1102, the first Wi-Fi device 1101 determines two groups of second measurement results based on the received second NDP frame, and the second Wi-Fi device 1102 determines two groups of first measurement results based on the received first NDP frame.

The two groups of second measurement results are in a one-to-one correspondence with the two reflection paths 1106 and 1107 for transmitting the second NDP frame from the second Wi-Fi device 1102 to the first Wi-Fi device 1101. A second measurement result corresponding to the reflection path 1106 includes an angle of arrival $\theta 2^2$, relative time of flight, and a Doppler frequency shift of the reflection path 1106. A second measurement result corresponding to the reflection path 1107 includes an angle of arrival $\theta 1^2$, relative time of flight, and a Doppler frequency shift of the reflection path 1107.

The two groups of first measurement results are in a one-to-one correspondence with the two reflection paths 1106 and 1107 for transmitting the first NDP frame from the first Wi-Fi device 1101 to the second Wi-Fi device 1102. A first measurement result corresponding to the reflection path 1106 includes an angle of arrival $\theta 2^1$, relative time of flight, and a Doppler frequency shift of the reflection path 1106. A first measurement result corresponding to the reflection path 1107 includes an angle of arrival $\theta 1^1$, relative time of flight, and a Doppler frequency shift of the reflection path 1107.

It should be noted that a principle of determining the measurement result has been described above. Therefore, details are not described herein again.

The second Wi-Fi device 1102 generates sensing measurement report information based on the two groups of first measurement results, and sends the sensing measurement report information to the first Wi-Fi device 1101.

The first Wi-Fi device 1101 obtains the two groups of first measurement results from the sensing measurement report information, and matches relative time of flight and a Doppler frequency shift in each group of first measurement results with relative time of flight and a Doppler frequency shift in each group of second measurement results, to determine a first transmission path and a second transmission path of a same passive target. Then, locations and instantaneous speeds of the two passive targets 1103 and 1104 are determined based on angle of arrival, relative time of flight, and Doppler frequency shift in the first transmission path and angle of arrival, relative time of flight, and Doppler frequency shift in the second transmission path of the same passive target and the foregoing manner.

The following describes in detail an apparatus provided in embodiments of this application.

Figure 12:
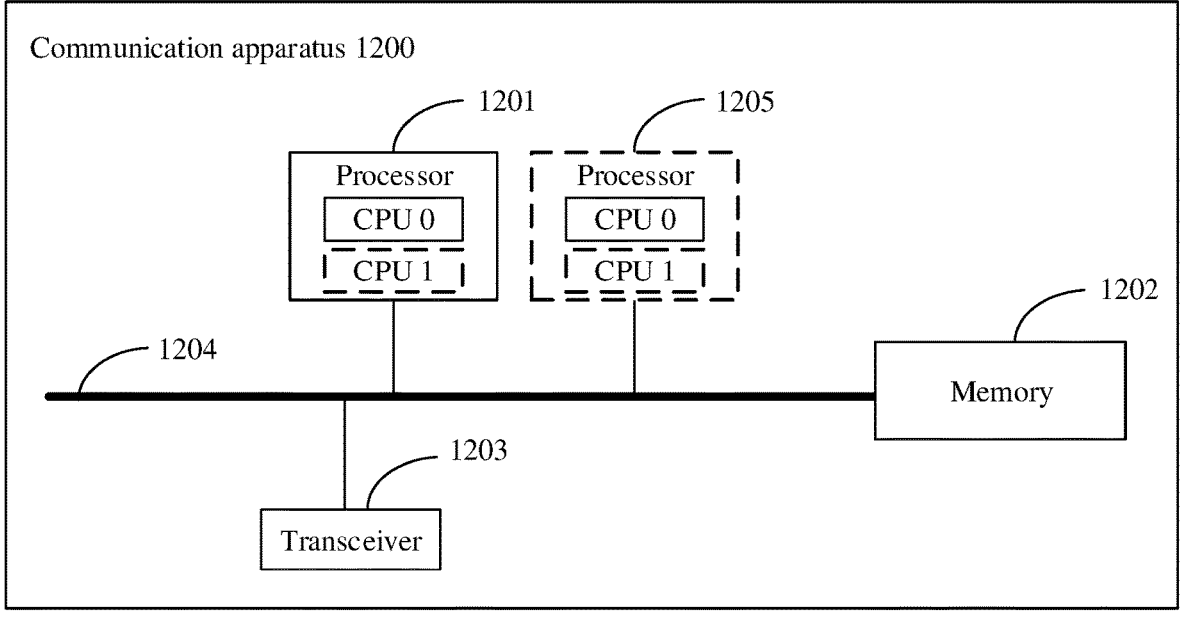
FIG. 12 is a schematic diagram of a sensing measurement information exchange apparatus according to at least one embodiment of this application.

FIG. 12 shows a sensing measurement information exchange apparatus 1200 according to an embodiment of this application. The apparatus may be a first station, a second station, or a chip or a processing system in a station in the foregoing embodiments, and may implement the method and functions in any embodiment of this application. Due to a difference in integration levels, the sensing measurement information exchange apparatus may include one or more of components shown in FIG. 12. The components shown in FIG. 12 may include at least one processor 1201, a memory 1202, a transceiver 1203, and a communication bus 1204.

The following describes each component of the sensing measurement information exchange apparatus 1200 in detail with reference to FIG. 12.

The processor 1201 is a control center of the sensing measurement information exchange apparatus 1200, and may be one processor or may be a collective term of a plurality of processing elements. For example, the processor 1201 is a central processing unit (central processing unit, CPU), an application-specific integrated circuit (Application Specific Integrated Circuit, ASIC), or one or more integrated circuits configured to implement this embodiment of this application, for example, one or more microprocessors (digital signal processor, DSP), or one or more field programmable gate arrays (Field Programmable Gate Array, FPGA). The processor 1201 may perform various functions of the sensing measurement information exchange apparatus by running or executing a software program stored in the memory 1202 and invoking data stored in the memory 1202. During specific implementation, in an embodiment, the processor 1201 may include one or more CPUs, for example, a CPU 0 and a CPU 1 in FIG. 12.

During specific implementation, in an embodiment, the sensing measurement information exchange apparatus 1200 may include a plurality of processors, for example, the processor 1201 and a processor 1205 in FIG. 12. Each of the processors may be a single-core processor (single-CPU) or may be a multi-core processor (multi-CPU). The processor herein may be one or more communication devices, circuits, and/or processing cores configured to process data (for example, computer program instructions).

The memory 1202 may be a read-only memory (read-only memory, ROM) or another type of static storage communication device that can store static information and instructions, or a random access memory (random access memory, RAM) or another type of dynamic storage communication device that can store information and instructions, or a non-volatile readable storage medium, or may be an electrically erasable programmable read-only memory (Electrically Erasable Programmable Read-Only Memory, EEPROM), a compact disc read-only memory (Compact Disc Read-Only Memory, CD-ROM) or other compact disc storage, optical disc storage (including a compact disc, a laser disc, an optical disc, a digital versatile disc, a Blu-ray disc, and the like), a magnetic disk storage medium or another magnetic storage communication device, or any other medium that can be used to carry or store expected program code in an instruction form or a data structure form and that can be accessed by a computer. However, the memory is not limited thereto. The memory 1202 may exist independently, and be connected to the processor 1201 through the communication bus 1204. The memory 1202 may be alternatively integrated with the processor 1201. The memory 1202 is configured to store a software program for implementing solutions of this application, and the processor 1201 controls the implementation.

The transceiver 1203 is configured to communicate with another device (for example, the station in the embodiment shown in FIG. 1). Certainly, the transceiver 1203 may be further configured to communicate with a communication network, for example, the Ethernet, a radio access network (radio access network, RAN), or a wireless local area network (Wireless Local Area Network, WLAN). The transceiver 1203 may include a receiving unit for implementing a receiving function and a sending unit for implementing a sending function.

The communication bus 1204 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The bus may be classified into an address bus, a data bus, a control bus, and the like. For ease of representation, only one thick line is for representing the bus in FIG. 12, but this does not mean that there is only one bus or only one type of bus.

In an example, the sensing measurement information exchange apparatus 1200 is an entire device. The sensing measurement information exchange apparatus may include the processor 1201, the memory 1202, the transceiver 1203, and the communication bus 1204, and In some embodiments, may further include another component such as a display.

In some embodiments, the sensing measurement information exchange apparatus 1200 is the first station, and may be configured to implement the method and the functions related to the first station in the foregoing embodiments. For example, the memory stores a computer program (instructions). When the processor invokes the computer program, the foregoing methods and functions are implemented. For example, the processor is configured to obtain angles of arrival, relative time of flight, and Doppler frequency shifts of N first transmission paths based on sensing measurement report information. The transceiver is configured to receive the sensing measurement report information sent by the second station. In an example, for example, the processor is configured to control the transceiver to perform step 603.

In some embodiments, the sensing measurement information exchange apparatus 1200 is the second station, and may be configured to implement the method and the functions related to the second station in the foregoing embodiments. For example, the memory stores a computer program. When the processor invokes the computer program, the foregoing methods and functions are implemented. For example, the processor is configured to generate sensing measurement report information based on N groups of first measurement results, and the transceiver is configured to send the sensing measurement report information to the first station. In an example, for example, the processor is configured to control the transceiver to perform step 602.

In another example, the sensing measurement information exchange apparatus 1200 is the chip or the processing system installed in a station. The chip or the processing system includes the processor 1201. The processor 1201 is configured to execute an instruction stored in the memory, so that the station on which the chip or the processing system is installed performs the method in any one of the foregoing aspects. In some embodiments, the memory may be integrated into the chip or the processing system, and is an on-chip storage unit. In some embodiments, the memory may be located outside the chip or the processing system, is coupled to the chip or the processing system, and is an off-chip storage unit.

In some embodiments, the sensing measurement information exchange apparatus 1200 is a chip or a processing system installed in the first station, so that the first station performs the method related to the first station in any one of the foregoing embodiments. For example, the memory stores a computer program (instructions). When a processing system invokes the computer program, the first station is enabled to perform the following operations: receiving sensing measurement report information sent by the second station, and obtaining angles of arrival, relative time of flight, and Doppler frequency shifts of N first transmission paths based on the sensing measurement report information.

In some embodiments, the sensing measurement information exchange apparatus 1200 is a chip or a processing system installed in the second station, so that the second station performs the method related to the second station in any one of the foregoing embodiments. For example, the memory stores a computer program (instructions). When a processing system invokes the computer program, the second station is enabled to perform the following operations: generating sensing measurement report information based on N groups of first measurement results, where the N groups of first measurement results are in a one-to-one correspondence with N first transmission paths between the first station and the second station, and each group of first measurement results includes an angle of arrival, relative time of flight, and a Doppler frequency shift of a corresponding first transmission path; and sending the sensing measurement report information to the first station.

In the embodiments of this application, the first station and the second station may be divided into function modules based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in embodiments of this application, module division is an example, and is only a logical function division. In actual implementation, another division manner may be used.

Figure 13:
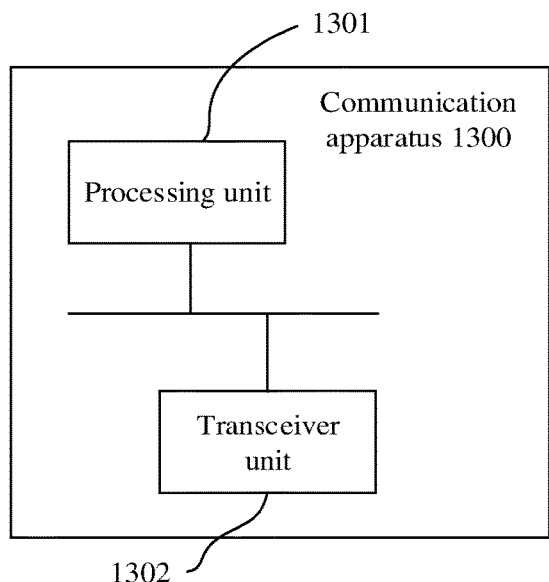
FIG. 13 is a schematic diagram of a possible structure of a sensing measurement information exchange apparatus according to at least one embodiment of this application.

When an integrated unit is used, FIG. 13 shows a possible structure of a sensing measurement information exchange apparatus 1300. The sensing measurement information exchange apparatus 1300 may be a first station or a second station. The sensing measurement information exchange apparatus 1300 may perform an operation of the first station or an operation of the second station in the foregoing method embodiments. The communication apparatus 1300 includes a processing unit 1301 and a transceiver unit 1302.

The processing unit 1301 may be configured to control and manage an action of the sensing measurement information exchange apparatus 1300. For example, the processing unit 1301 may be configured to obtain angles of arrival, relative time of flight, and Doppler frequency shifts of N first transmission paths based on sensing measurement report information. For another example, the sensing measurement report information is generated based on N groups of first measurement results. For another example, the processing unit 1301 may be configured to control an operation of the transceiver unit 1302. In some embodiments, if the sensing measurement information exchange apparatus 1300 includes a storage unit, the processing unit 1301 may further execute a program or instructions stored in the storage unit, to enable the sensing measurement information exchange apparatus 1300 to implement the methods and the functions in any one of the foregoing embodiments.

For example, the processing unit 1301 may control the transceiver unit 1302 to perform step 603 or step 602 in FIG. 6, and/or another process of the technology described in this specification. All related content of the steps in the foregoing method embodiments may be cited in function descriptions of the corresponding function modules. Details are not described herein again.

For example, the transceiver unit 1302 may receive sensing measurement report information sent by the second station, or may send the sensing measurement report information. In some embodiments, the transceiver unit 1302 may be one transceiver module, or may include a plurality of transceiver modules. When the transceiver unit 1302 is one transceiver module, the transceiver module may send and receive the sensing measurement report information. For example, the transceiver unit 1302 may be configured to perform step 603 or step 602 in FIG. 6, and/or another process of the technology described in this specification. All related content of the steps in the foregoing method embodiments may be cited in function descriptions of the corresponding function modules. Details are not described herein again.

For example, the sensing measurement information exchange apparatus 1300 may be the sensing measurement information exchange apparatus shown in FIG. 12, the processing unit 1301 may be the processor 1201 in FIG. 12, and the transceiver unit 1302 may be the transceiver 1203 in FIG. 12. In some embodiments, the communication apparatus 1300 may further include a memory. The memory is configured to store program code and data corresponding to the steps performed by the first station or the steps performed by the second station that are provided above and that are performed by the sensing measurement information exchange apparatus 1200. All descriptions of related content of the components in FIG. 12 may be cited in function descriptions of corresponding components of the communication apparatus 1300. Details are not described herein again.

For example, the sensing measurement information exchange apparatus 1300 may alternatively be a chip or a processor, the processing unit 1301 is a processing circuit in the chip or the processor, the transceiver unit 1302 may be an input/output circuit in the chip or the processor, the input/output circuit is an interface for mutual communication or data exchange between the chip or the processor and another coupled component. It may be ensured that signaling or data information or program instructions are input to the chip or the processor for processing, processed data or signaling is output to the another coupled component, and the first multi-link device on which the chip or the processor is installed is controlled to implement functions.

An embodiment of this application further provides a computer-readable storage medium. The computer-readable storage medium stores computer program code. When the foregoing processor executes the computer program code, an electronic device (for example, a first station and a second station) in which the processor is located is enabled to perform the method in any one of the embodiments.

An embodiment of this application further provides a computer program product, and when the computer program product is run on a computer, the computer (for example, a first station and a second station) is enabled to perform the method in any one of the embodiments.

An embodiment of this application further provides a sensing measurement information exchange apparatus. The apparatus may exist in a product form of a chip. A structure of the apparatus includes a processor and an interface circuit. The processor is configured to communicate with another apparatus through a receiving circuit, to enable the apparatus to perform the method in any one of the embodiments.

An embodiment of this application further provides a communication system. The communication system includes the foregoing first station and second station. The first station and the second station may perform the method in any one of the foregoing embodiments. Method or algorithm steps described in combination with the content disclosed in this application may be implemented by using hardware, or may be implemented by using a processor by executing a software instruction. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are only specific implementations of this application, but are not intended to limit the protection scope of this application. Any modification, equivalent replacement, improvement, or the like made based on the technical solutions of this application shall fall within the protection scope of this application.

A person skilled in the art may be aware that units and algorithm steps in the examples described with reference to the embodiments disclosed in this specification can be implemented by electronic hardware or an interaction of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed systems, apparatuses, and methods may be implemented in another manner. For example, the described apparatus embodiment is only an example. For example, division into the units is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to some approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are only specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A first station, comprising a processor and a non-transitory memory, the non-transitory memory is configured to store non-transitory instructions, and the processor is configured to execute the non-transitory instructions, thereby causing the first station to perform:

receiving sensing measurement report information from a second station, wherein the sensing measurement report information comprises N groups of first measurement results, wherein the N groups of first measurement results are in a one-to-one correspondence with N first transmission paths between the first station and the second station, and each group of first measurement results of the N groups of first measurement results comprises at least one of an angle of arrival, relative time of flight, or a Doppler frequency shift of a corresponding first transmission path; and obtaining at least one of the angle of arrival, relative time of flight, or Doppler frequency shift of the N first transmission paths based on the sensing measurement report information, wherein the sensing measurement report information is included in a location measurement report frame, wherein a measurement result field and a measurement result group quantity field are added to the location measurement report frame, wherein a value of the measurement result field is the N groups of first measurement results, a value of the measurement result group quantity field is the group quantity of the N groups of first measurement results, a value of a type field in the location measurement report frame is a first value indicating that a type of the location measurement report frame is a sensing measurement report frame, and a value of a carrier frequency offset parameter field in the location measurement report frame is the carrier frequency offset;

the sensing measurement report information is included in a predefined frame, wherein the predefined frame comprises the type field, the measurement result field, the measurement result group quantity field, and the carrier frequency offset parameter field, wherein the value of the type field is a second value indicating that a type of the predefined frame is the sensing measurement report frame, the value of the measurement result field is the N groups of first measurement results, the value of the measurement result group quantity field is the group quantity of the N groups of first measurement results, and the value of the carrier frequency offset parameter field is the carrier frequency offset; or the sensing measurement report information is included in a predefined element, wherein the predefined element comprises an element identifier field, the measurement result field, the measurement result group quantity field, and the carrier frequency offset parameter field, wherein a value of the element identifier field is a third value indicating that a type of the predefined element is a sensing measurement report element, the value of the measurement result field is the N groups of first measurement results, the value of the measurement result group quantity field is the group quantity of the N groups of first measurement results, and the value of the carrier frequency offset parameter field is the carrier frequency offset.

2. The apparatus according to claim 1, wherein the sensing measurement report information further comprises measurement result group quantity information, wherein the measurement result group quantity information indicates a group quantity of the N groups of first measurement results.

3. The apparatus according to claim 2, wherein the sensing measurement report information further comprises report type information, wherein the report type information indicates a type of the sensing measurement report information.

4. The apparatus according to claim 3, wherein the sensing measurement report information further comprises carrier frequency offset parameter information, wherein the carrier frequency offset parameter information indicates a carrier frequency offset.

5. The apparatus according to claim 1, wherein the processor is further configured to execute the non-transitory instructions, thereby further causing the first station to perform:

before receiving the sensing measurement report information from the second station, performing M sensing measurements, wherein each sensing measurement comprises:

sending a first sounding frame to the second station; and receiving a second sounding frame from the second station.

6. The apparatus according to claim 5, wherein the processor is further configured to execute the non-transitory instructions, thereby further causing the first station to perform:

before performing the M sensing measurements, sending sensing measurement announcement information to the second station, wherein the sensing measurement announcement information is useable to indicate to perform sensing measurement.

7. The apparatus according to claim 6, wherein the sensing measurement announcement information includes a quantity (M) of times of sensing measurement or sensing measurement termination information.

8. The apparatus according to claim 7, wherein the sensing measurement announcement information is included in a null data packet announcement frame, wherein a value of a frame type subfield in a frame control field in the null data packet announcement frame is a fourth value indicating the second station to perform sensing measurement, and a value of any subfield in a station information field in the null data packet announcement frame is the quantity (M) of times of the sensing measurement or the sensing measurement termination information;

a value of a reserved bit in a sounding dialog token field in the null data packet announcement frame is a fifth value indicating the second station to perform sensing measurement, and the value of any subfield in the station information field in the null data packet announcement frame is the quantity (M) of times of the sensing measurement or the sensing measurement termination information;

a value of one or more reserved bits in the station information field in the null data packet announcement frame is a sixth value indicating the second station to perform sensing measurement, and a value of the one or more reserved bits is the sensing measurement termination information;

a value of a reserved bit in one station information field in the null data packet announcement frame is a seventh value indicating the second station to perform sensing measurement, and a value of a reserved bit in another station information field in the null data packet announcement frame is the quantity (M) of times of the sensing measurement or the sensing measurement termination information; or a value of an association identifier subfield in the station information field in the null data packet announcement frame is an integer ranging from 2008 to 2047 indicating the second station to perform sensing measurement, and a value of a remaining field in the station information field is the quantity (M) of times of the sensing measurement or the sensing measurement termination information.

9. The apparatus according to claim 6, wherein the processor is further configured to execute the non-transitory instructions, thereby further causing the first station to perform:

sending the sensing measurement announcement information to the second station, wherein sending the sensing measurement announcement information to the second station comprises:

sending the sensing measurement announcement information to the second station at a first moment in a first time period, wherein the first time period is an overlap between a time period in which the first station is configured to perform sensing measurement and a time period in which the second station is configured to perform sensing measurement.

10. The apparatus according to claim 6, wherein the processor is further configured to execute the non-transitory instructions, thereby further causing the first station to perform:

before sending the sensing measurement announcement information to the second station, sending a sensing measurement request to the second station, wherein the sensing measurement request includes a time period in which the first station is configured to perform sensing measurement, channel information, and a maximum quantity of times of sensing measurement between the first station and the second station, wherein the maximum quantity of times of sensing measurement is greater than or equal to M; and receiving response information from the second station based on the sensing measurement request, wherein the response information includes the first time period, wherein the first time period is an overlap between a time period in which the first station is configured to perform sensing measurement and a time period in which the second station is configured to perform sensing measurement.

11. The apparatus according to claim 5, wherein the processor is further configured to execute the non-transitory instructions, thereby further causing the first station to perform:

determining Z groups of second measurement results based on M second sounding frames received in the M sensing measurements, wherein the Z groups of second measurement results are in a one-to-one correspondence with Z second transmission paths between the first station and the second station, and each group of the Z groups of second measurement results comprises at least one of an angle of arrival, relative time of flight, or a Doppler frequency shift of a corresponding second transmission path; and determining a location and an instantaneous speed of each passive target based on the at least one of the angles of arrival, the relative time of flight, or the Doppler frequency shifts of the N first transmission paths, and at least one of angle of arrival, relative time of flight, or Doppler frequency shifts of the Z second transmission paths, wherein the passive target is located on the transmission path.

12. The apparatus according to claim 11, wherein the processor is further configured to execute the non-transitory instructions, thereby further causing the first station to perform:

determining a first transmission path and a second transmission path of a same passive target based on the at least one of the angle of arrival, the relative time of flight, or the Doppler frequency shifts of the N first transmission paths, and the at least one of the angle of arrival, the relative time of flight, or the Doppler frequency shifts of the Z second transmission paths, thereby obtaining a first transmission path and a second transmission path of each passive target;

separately determining the location of each passive target based on an angle of arrival and relative time of flight of the first transmission path of each passive target, an angle of arrival and relative time of flight of the second transmission path of each passive target, and a location of the first station or a location of the second station; and determining the instantaneous speed of each passive target based on a Doppler frequency shift of the first transmission path or a Doppler frequency shift of the second transmission path of each passive target and a carrier wavelength of the sounding frame.

13. A second station, comprising a processor and a non-transitory memory, the non-transitory memory is configured to store non-transitory instructions, and the processor is configured to execute the non-transitory instructions, thereby causing the second station to perform:

generating sensing measurement report information based on N groups of first measurement results, wherein the N groups of first measurement results are in a one-to-one correspondence with N first transmission paths between a first station and the second station, and each group of first measurement results of the N groups of first measurement results comprises at least one of an angle of arrival, relative time of flight, or a Doppler frequency shift of a corresponding first transmission path; and sending the sensing measurement report information to the first station, wherein the sensing measurement report information is included in a location measurement report frame, wherein a measurement result field and a measurement result group quantity field are added to the location measurement report frame, wherein a value of the measurement result field is the N groups of first measurement results, a value of the measurement result group quantity field is the group quantity of the N groups of first measurement results, a value of a type field in the location measurement report frame is a first value indicating that a type of the location measurement report frame is a sensing measurement report frame, and a value of a carrier frequency offset parameter field in the location measurement report frame is the carrier frequency offset;

the sensing measurement report information is included in a predefined frame, wherein the predefined frame comprises the type field, the measurement result field, the measurement result group quantity field, and the carrier frequency offset parameter field, wherein the value of the type field is a second value indicating that a type of the predefined frame is the sensing measurement report frame, the value of the measurement result field is the N groups of first measurement results, the value of the measurement result group quantity field is the group quantity of the N groups of first measurement results, and the value of the carrier frequency offset parameter field is the carrier frequency offset; or the sensing measurement report information is included in a predefined element, wherein the predefined element comprises an element identifier field, the measurement result field, the measurement result group quantity field, and the carrier frequency offset parameter field, wherein a value of the element identifier field is a third value indicating that a type of the predefined element is a sensing measurement report element, the value of the measurement result field is the N groups of first measurement results, the value of the measurement result group quantity field is the group quantity of the N groups of first measurement results, and the value of the carrier frequency offset parameter field is the carrier frequency offset.

14. The apparatus according to claim 13, wherein the sensing measurement report information further comprises measurement result group quantity information, wherein the measurement result group quantity information indicates a group quantity of the N groups of first measurement results.

15. The apparatus according to claim 14, wherein the sensing measurement report information further comprises report type information, wherein the report type information indicates a type of the sensing measurement report information.

16. The apparatus according to claim 15, wherein the sensing measurement report information further comprises carrier frequency offset parameter information, wherein the carrier frequency offset parameter information indicates a carrier frequency offset.

17. The apparatus according to claim 13, wherein the processor is further configured to execute the non-transitory instructions, thereby further causing the second station to perform:

before generating the sensing measurement report information based on the N groups of first measurement results, performing M sensing measurements with the first station, wherein each sensing measurement comprises:

receiving a first sounding frame from the first station; and sending a second sounding frame to the first station.

18. A sensing measurement information exchange method, comprising:

receiving, by a first station, sensing measurement report information from a second station, wherein the sensing measurement report information comprises N groups of first measurement results, wherein the N groups of first measurement results are in a one-to-one correspondence with N first transmission paths between the first station and the second station, and each group of first measurement results of the N groups of first measurement results comprises at least one of an angle of arrival, relative time of flight, or a Doppler frequency shift of a corresponding first transmission path; and obtaining at least one of the angle of arrival, relative time of flight, or Doppler frequency shifts of the N first transmission paths based on the sensing measurement report information, wherein the sensing measurement report information is included in a location measurement report frame, wherein a measurement result field and a measurement result group quantity field are added to the location measurement report frame, wherein a value of the measurement result field is the N groups of first measurement results, a value of the measurement result group quantity field is the group quantity of the N groups of first measurement results, a value of a type field in the location measurement report frame is a first value indicating that a type of the location measurement report frame is a sensing measurement report frame, and a value of a carrier frequency offset parameter field in the location measurement report frame is the carrier frequency offset;

the sensing measurement report information is included in a predefined frame, wherein the predefined frame comprises the type field, the measurement result field, the measurement result group quantity field, and the carrier frequency offset parameter field, wherein the value of the type field is a second value indicating that a type of the predefined frame is the sensing measurement report frame, the value of the measurement result field is the N groups of first measurement results, the value of the measurement result group quantity field is the group quantity of the N groups of first measurement results, and the value of the carrier frequency offset parameter field is the carrier frequency offset; or the sensing measurement report information is included in a predefined element, wherein the predefined element comprises an element identifier field, the measurement result field, the measurement result group quantity field, and the carrier frequency offset parameter field, wherein a value of the element identifier field is a third value indicating that a type of the predefined element is a sensing measurement report element, the value of the measurement result field is the N groups of first measurement results, the value of the measurement result group quantity field is the group quantity of the N groups of first measurement results, and the value of the carrier frequency offset parameter field is the carrier frequency offset.

* * * * *